US012633081B2

(12) United States Patent
    Kawakami

(10) Patent No.:    US 12,633,081 B2
(45) Date of Patent:     May 19, 2026

(54) IMAGE PROCESSING SYSTEM, IMAGE PROCESSING METHOD, AND NON-TRANSITORY COMPUTER-READABLE STORAGE MEDIUM

(71) Applicant: NEC Corporation, Tokyo (JP)

(72) Inventor: Kazuya Kawakami, Tokyo (JP)

(73) Assignee: NEC CORPORATION, Tokyo (JP)

( * ) Notice: Subject to any disclaimer, the term of this patent is extended or adjusted under 35 U.S.C. 154(b) by 287 days.

(21) Appl. No.: 18/241,785

(22) Filed: Sep. 1, 2023

(65) Prior Publication Data

US 2024/0078783 A1     Mar. 7, 2024

(30) Foreign Application Priority Data

Sep. 7, 2022    (JP) ................................. 2022-141928

(51) Int. Cl.
   *G06V 10/26*       (2022.01)
   *G06V 40/16*       (2022.01)
   *G06V 40/20*       (2022.01)

(52) U.S. Cl.
   CPC .......... *G06V 10/273* (2022.01); *G06V 40/172* (2022.01); *G06V 40/20* (2022.01)

(58) Field of Classification Search
   CPC .... G06V 10/273; G06V 40/172; G06V 40/20; G06V 40/161; G06V 20/52
   See application file for complete search history.

(56) References Cited

U.S. PATENT DOCUMENTS

2021/0065454 A1*   3/2021   Goodrich ............... G06N 20/00

FOREIGN PATENT DOCUMENTS

| | | |
|---|---|---|
| JP | 2006-148386 A | 6/2006 |
| JP | 2006-295251 A | 10/2006 |
| JP | 2007-251556 A | 9/2007 |
| JP | 2011-130203 A | 6/2011 |
| WO | 2018/225775 A1 | 12/2018 |
| WO | 2021/186866 A1 | 9/2021 |

* cited by examiner

*Primary Examiner* — Duy M Dang

(74) *Attorney, Agent, or Firm* — Sughrue Mion, PLLC

(57)         ABSTRACT

An image processing system includes: a determination unit that determines a person included in an image; a mask processing unit that performs mask processing on a face region including at least a part of a face of the determined person; and a deletion unit that deletes an unnecessary portion from the image.

18 Claims, 24 Drawing Sheets

1   IMAGE PROCESSING SYSTEM

IMAGE 32

| CAMERA ID | C0101 | |
|---|---|---|
| FRAME NO. | DATE AND TIME | FLAG A (FACE MASK PROCESSING) |
| ⋮ | ⋮ | ⋮ |
| frame0011 | yymmdd hhmmss | 0 |
| frame0012 | yymmdd hhmmss | 1 |
| frame0013 | yymmdd hhmmss | 1 |
| ⋮ | ⋮ | ⋮ |
| frame0110 | yymmdd hhmmss | 1 |
| frame0111 | yymmdd hhmmss | 1 |
| frame0112 | yymmdd hhmmss | 1 |
| ⋮ | ⋮ | ⋮ |

FIG. 8

IMAGE 32

| CAMERA ID | C0101 | | |
|---|---|---|---|
| FRAME NO. | DATE AND TIME | FLAG A (FACE MASK PROCESSING) | FLAG B (ABNORMAL BEHAVIOR DETECTION) |
| ⋮ | ⋮ | ⋮ | ⋮ |
| frame0011 | yymmdd hhmmss | 0 | 0 |
| frame0012 | yymmdd hhmmss | 1 | 0 |
| frame0013 | yymmdd hhmmss | 1 | 0 |
| ⋮ | ⋮ | ⋮ | ⋮ |
| frame0110 | yymmdd hhmmss | 1 | 1 |
| frame0111 | yymmdd hhmmss | 1 | 1 |
| frame0112 | yymmdd hhmmss | 1 | 0 |
| ⋮ | ⋮ | ⋮ | ⋮ |

FIG. 18

330 KEY INFORMATION

| DECRYPTION KEY (CAPTURING PLACE, CAPTURING TIME) |
| ENCRYPTION KEY INFORMATION |

FIG. 19

330 KEY INFORMATION

| DECRYPTION KEY (CAPTURING PLACE, CAPTURING TIME) |
| --- |
| BACKGROUND IMAGE |
| ENCRYPTION KEY INFORMATION |

Figure 23:
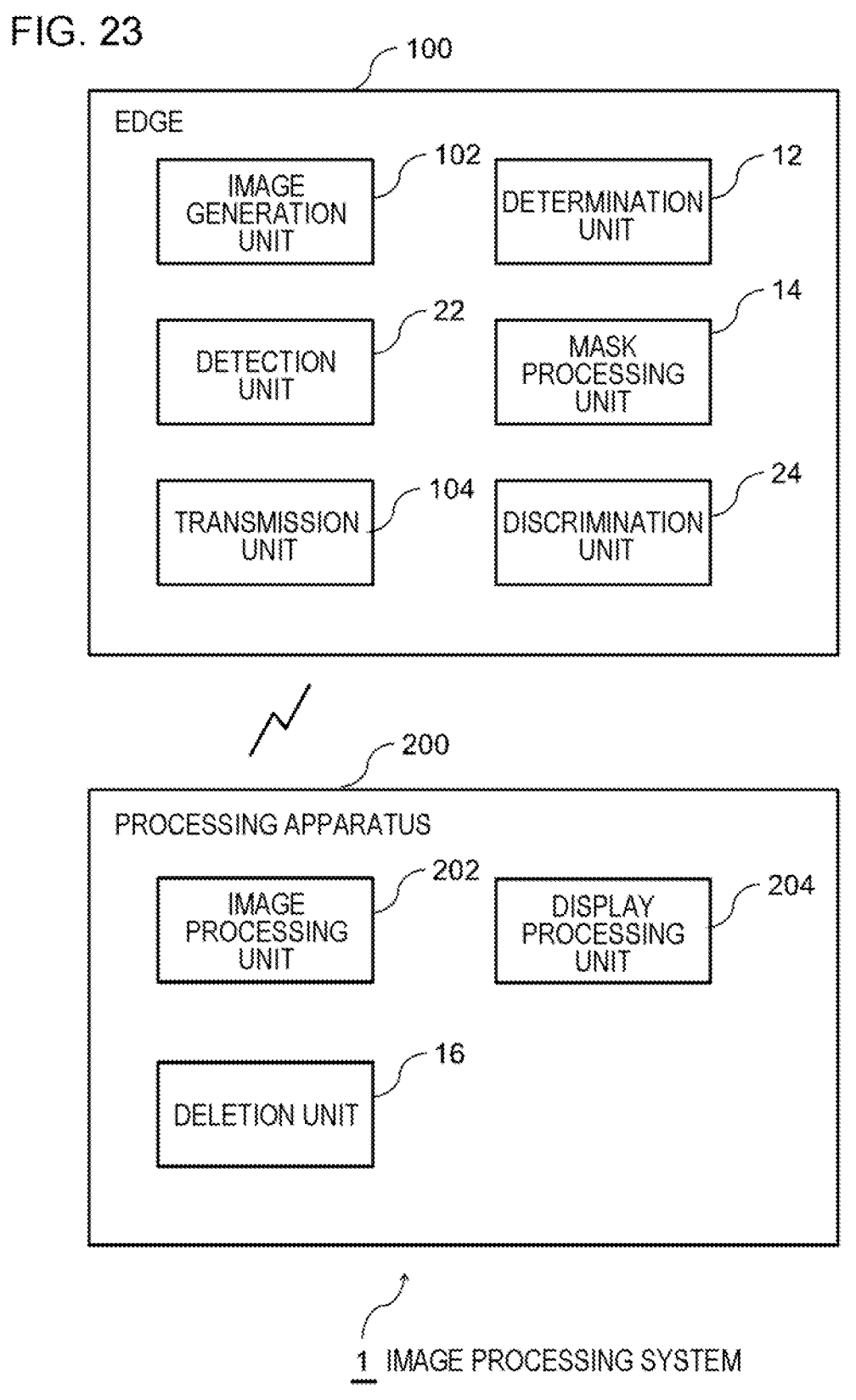

EDGE

| IMAGE GENERATION UNIT | 102 |

| DETERMINATION UNIT | 12 |

| DETECTION UNIT | 22 |

| MASK PROCESSING UNIT | 14 |

| TRANSMISSION UNIT | 104 |

| DISCRIMINATION UNIT | 24 |

200

PROCESSING APPARATUS

| IMAGE PROCESSING UNIT | 202 |

| DISPLAY PROCESSING UNIT | 204 |

| DELETION UNIT | 16 |

1  IMAGE PROCESSING SYSTEM

IMAGE PROCESSING SYSTEM, IMAGE PROCESSING METHOD, AND NON-TRANSITORY COMPUTER-READABLE STORAGE MEDIUM

This application is based upon and claims the benefit of priority from Japanese Patent Application No. 2022-141928 filed on Sep. 7, 2022, the disclosure of which is incorporated herein in its entirety by reference.

TECHNICAL FIELD

The present invention relates to an image processing system, an image processing method, and a program.

BACKGROUND ART

In recent years, a camera is installed at various places, and a scene captured without personal consent is also increasing. Protection of privacy of an individual captured in such a capturing image is required.

One example of a system for providing an effective video when a person is surveyed while achieving protection of privacy of an individual is described in Patent Document 1 (International Patent Publication No. WO2021/186866). The system described in Patent Document 1 includes a behavior detection means for detecting behavior of a person included in capturing data, a feeling detection means for detecting a feeling of a person, a suspiciousness degree computation means for computing a suspiciousness degree indicating a degree of surveying a person, based on the detected behavior of the person and the detected feeling of the person, and a mask processing means for performing mask processing being processing of reducing an information amount of a region of the capturing data in which a person is captured, based on the computed suspiciousness degree.

Patent Document 2 (International Patent Publication No. WO2018/225775) describes an apparatus that automatically extracts a face and the like of a person being a masking target from an input image, provides masking to an extracted target portion, and processes an image provided with the masking. Further, for a person being a masking target, a configuration for detecting attribute information (such as an age and gender) about the person from an image, providing and outputting the attribute information, and being able to cancel masking as necessary is described.

Patent Document 3 (Japanese Patent Application Publication No. 2011-130203) and Patent Document 4 (Japanese Patent Application Publication No. 2006-295251) describe that a plurality of person regions or persons are detected from a capturing image, computation of a feature value of each of the person regions or detection of a gesture and an act of each of the persons is performed, an evaluation value and a degree of importance of the pieces of information are computed, and image treatment processing (such as mosaic processing) according to a transmitted value is performed.

Patent Document 5 (Japanese Patent Application Publication No. 2006-148386) describes that a concealment value in masking processing is changed according to a state of a subject in an image. For each subject, discrimination by a wireless tag that identifies whether to intend to conceal his/her region, a change in a concealment value according to an amount of a change such as approaching or moving away, and the like are described.

SUMMARY OF INVENTION

Each of the techniques described in the literatures described above has a configuration for performing masking processing on a face region of a person and the like for a purpose of protecting privacy of an individual of a person in an image, however, in all of the literatures, for changing a degree of concealment of the masking processing and canceling the masking processing, an attribute is acquired from an image of the person, and behavior and a feeling are analyzed, thus, there is a problem that concealment cannot be performed without performing analysis processing on the face image of the person, and reliable protection for privacy of an individual cannot be assured.

One example of an object of the present invention is, in view of the problem described above, to provide an image processing system, an image processing method, and a program that solve the problem that privacy of an individual in a capturing image cannot be reliably protected.

One aspect of the present invention provides an image processing system including:

at least one memory configured to store instructions; and at least one processor configured to execute the instructions to:

determine a person included in an image;

perform mask processing on a face region including at least a part of a face of the determined person; and delete an unnecessary portion from the image.

One aspect of the present invention provides an image processing method including, by one or more computers:

determining a person included in an image;

performing mask processing on a face region including at least a part of a face of the determined person; and deleting an unnecessary portion from the image.

One aspect of the present invention provides a program for causing a computer to:

determine a person included in an image;

perform mask processing on a face region including at least a part of a face of the determined person; and transmit, to a processing apparatus, an image after the mask processing is performed by the mask processing.

Note that, another aspect according to the present invention may be a program causing at least one or more computers to execute the method in the one aspect described above, or may be a computer-readable storage medium that stores such a program. The storage medium includes a non-transitory tangible medium.

The computer program includes a computer program code causing a computer to execute the processing method on an edge, a processing apparatus, and a management apparatus when the computer program code is executed by the computer.

Note that, any combination of the components above and expression of the present invention being converted among a method, an apparatus, a system, a storage medium, a computer program, and the like are also effective as an aspect of the present invention.

Further, various components according to the present invention do not necessarily need to be an individually independent presence, and a plurality of components may be formed as one member, one component may be formed of a plurality of members, a certain component may be a part of another component, a part of a certain component and a part of another component may overlap with each other, and the like.

Further, a plurality of procedures are described in order in the method and the computer program according to the present invention, but the described order does not limit an order in which the plurality of procedures are executed. Thus, when the method and the computer program according to the present invention are executed, an order of the plurality of procedures can be changed within an extent that there is no harm.

Furthermore, a plurality of procedures of the method and the computer program according to the present invention are not limited to being executed at individually different timings. Thus, another procedure may occur during execution of a certain procedure, execution timing of a certain procedure and execution timing of another procedure may partially or entirely overlap with each other, and the like.

According to one aspect of the present invention, an image processing system, an image processing method, and a program that can reliably protect privacy of an individual in a capturing image can be achieved.

BRIEF DESCRIPTION OF THE DRAWINGS

FIG. 6 is a flowchart illustrating an operation example of the image processing system according to the example embodiment.

FIG. 7 is a diagram illustrating a data structure example of an image.

FIG. 8 is a diagram illustrating a data structure example of an image after a behavior analysis.

FIG. 18 is a diagram illustrating a data structure example of key information.

FIG. 19 illustrates a data structure example of the key information according to a modification aspect 1 of the example embodiment.

FIG. 23 is a functional block diagram illustrating a functional configuration example of each apparatus of an image processing system according to an example embodiment.

EXAMPLE EMBODIMENT

Hereinafter, example embodiments of the present invention will be described with reference to the drawings. Note that, in all of the drawings, a similar component has a similar reference sign, and description thereof will be appropriately omitted. Further, in each of the following drawings, a configuration of a portion unrelated to essence of the present invention is omitted and not illustrated.

"Acquisition" in an example embodiment includes at least one of acquisition (active acquisition), by its own apparatus, of data or information being stored in another apparatus or a storage medium, and inputting (passive acquisition) of data or information output from another apparatus to its own apparatus. Examples of the active acquisition include reception of a reply by making a request or an inquiry to another apparatus, reading by accessing another apparatus or a storage medium, and the like. Further, examples of the passive acquisition include reception of information to be distributed (transmitted, push-notified, or the like), and the like. Furthermore, "acquisition" may include acquisition by selection from among pieces of received data or pieces of received information, or reception by selecting distributed data or distributed information.

<Configuration Example>

Figure 1:
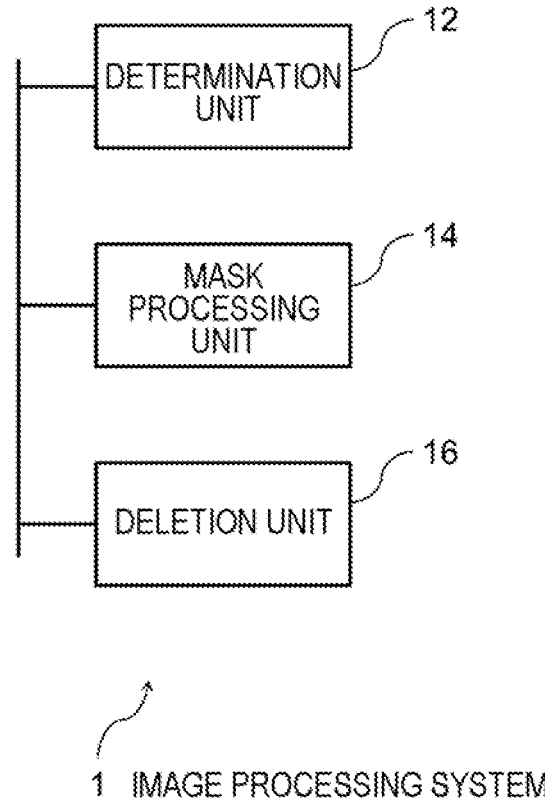
FIG. 1 is a diagram illustrating an overview of an image processing system according to an example embodiment.

FIG. 1 is a diagram illustrating an overview of an image processing system 1 according to an example embodiment. The image processing system 1 includes a determination unit 12, a mask processing unit 14, and a deletion unit 16.

The determination unit 12 determines a person included in an image.

The mask processing unit 14 performs mask processing on a face region including at least a part of a face of the determined person.

The deletion unit 16 deletes an unnecessary portion from the image.

<Operation Example>

Figure 2:
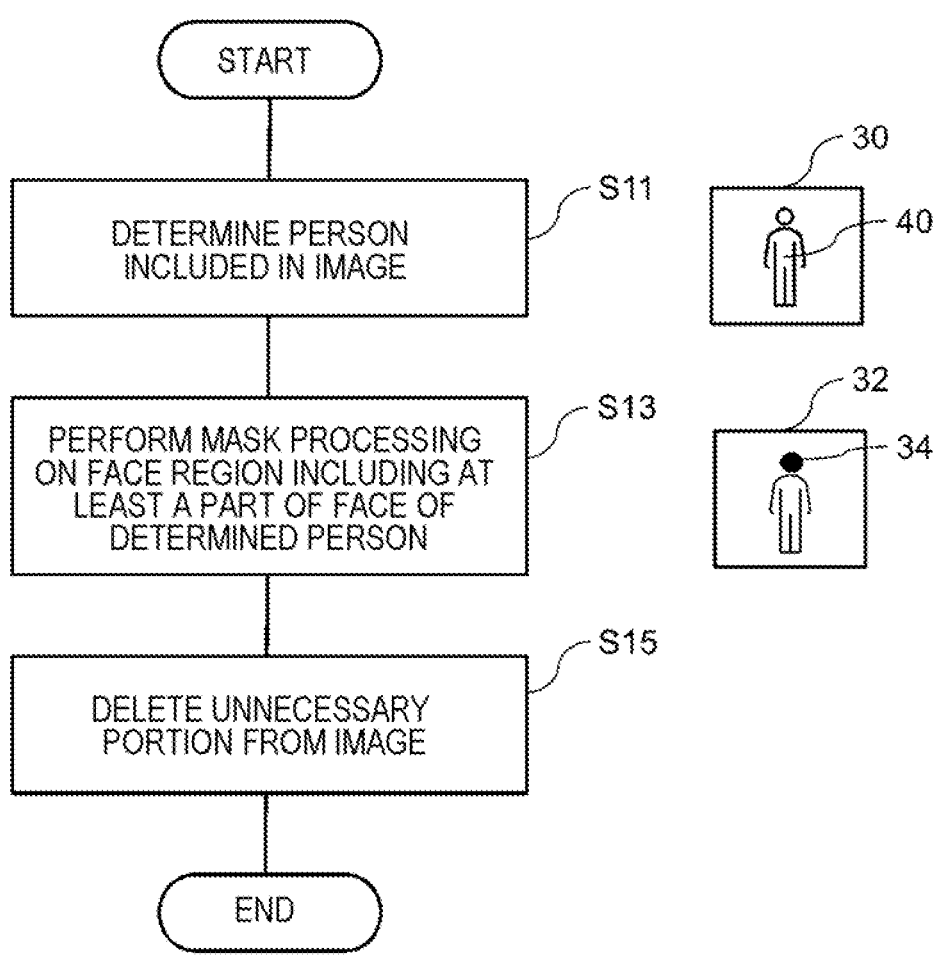
FIG. 2 is a flowchart illustrating an operation example of the image processing system according to the example embodiment.

FIG. 2 is a flowchart illustrating an operation example of the image processing system 1 according to the example embodiment.

First, the determination unit 12 determines a person included in an image (step S11). The image is captured and generated by a camera. The image is preferably a moving image, but may be an image frame for each predetermined interval or may be a still image. The determination unit 12 determines a person 40 by recognizing a "person" included in the image as an object. In other words, the determination unit 12 does not perform authentication processing such as personal determination.

Then, the mask processing unit 14 performs mask processing on a face region 34 including at least a part of a face of the determined person 40 (step S13). The mask processing unit 14 determines an upper region of a body of the determined person 40 as the face region 34 (region including at least a part of the face of the person) of the person, and performs the mask processing on the face region 34. The mask processing is processing of making a face region including at least a part of a face of a person visually unseen, and obtaining a state where who the person is cannot be recognized, by applying bluffing to the face region 34, performing mosaic processing on the face region 34, superimposing and displaying another image on the face region 34, and performing paint processing on the face region 34. In the diagram, an image after the mask processing is an image 32.

The deletion unit 16 deletes an unnecessary portion from the image (step S15). The unnecessary portion is, for example, an image in which a person is not captured among a plurality of images (or image frames) constituting a series of moving images. Furthermore, the unnecessary portion is, for example, an image in which a person being a target is not captured, or an image other than a predetermined time before and after and including an image in which the person being the target is captured.

A person being a target is, for example, a person performing abnormal behavior such as a person performing suspicious behavior, a person performing a criminal act, and a person being a victim of a crime. A discrimination method of a person being a target will be described in an example embodiment described below.

This image processing system 1 includes the determination unit 12, the mask processing unit 14, and the deletion unit 16. The determination unit 12 determines a person included in an image. The mask processing unit 14 performs mask processing on a face region including at least a part of a face of the determined person. The deletion unit 16 deletes an unnecessary portion from the image. Thus, a state where information that can determine an individual included in an image, for example, information about a face is not included can be obtained, and thus privacy of an individual in a capturing image can be reliably protected.

A detailed example of the image processing system 1 will be described below.

First Example Embodiment

<System Overview>

Figure 3:
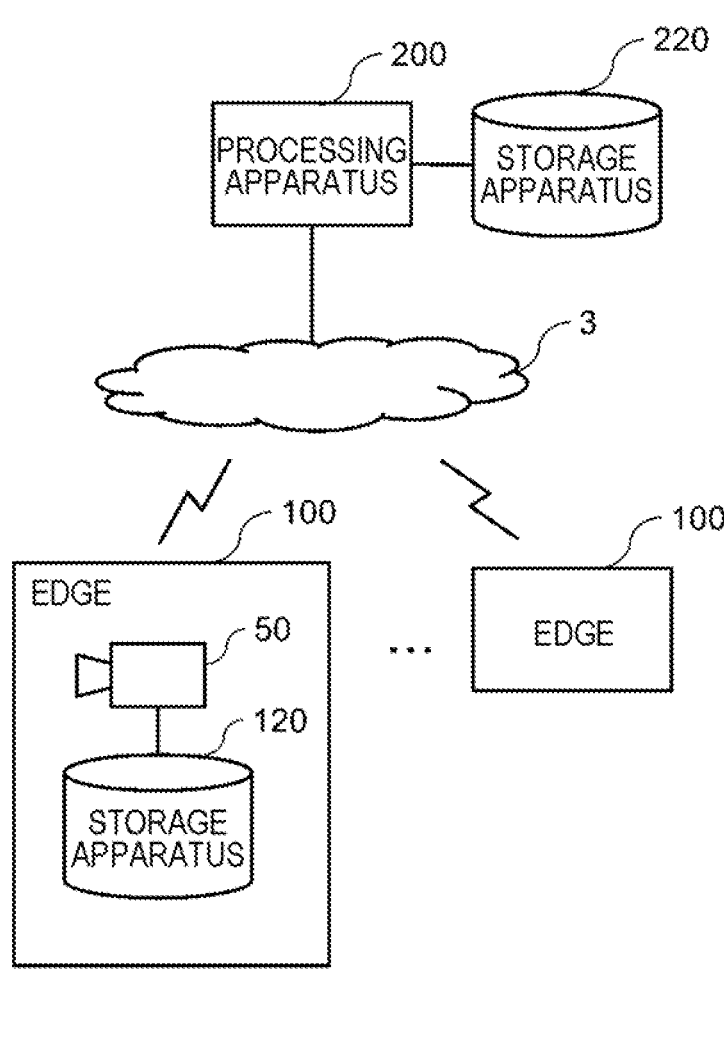
FIG. 3 is a diagram schematically illustrating a system configuration of the image processing system according to the example embodiment.

FIG. 3 is a diagram schematically illustrating a system configuration of the image processing system 1 according to the example embodiment.

The image processing system 1 includes at least one of edges 100 and a processing apparatus 200. The edge 100 and the processing apparatus 200 are connected to each other via a communication network 3. The communication network 3 is assumed to have a communication function in which security at a predetermined level or higher is secured.

The edge 100 is a computer including a camera 50 and a storage apparatus 120. The storage apparatus 120 may be provided inside at least one of the edges 100 and the camera 50, or may be provided outside. In other words, the storage apparatus 120 may be hardware integral with at least one of the edges 100 and the camera 50, or may be hardware separated from the edge 100 or the camera 50.

The processing apparatus 200 is a computer including a storage apparatus 220. The storage apparatus 220 may be provided inside the processing apparatus 200, or may be provided outside. In other words, the storage apparatus 220 may be hardware integral with the processing apparatus 200, or may be hardware separated from the processing apparatus 200.

The camera 50 includes a lens and a capturing element such as a charge coupled device (CCD) image sensor. The camera 50 may be a network camera such as an Internet protocol (IP) camera, for example. The network camera has, for example, a wireless local area network (LAN) communication function, and is connected to the processing apparatus 200 via the communication network 3, i.e., a relay apparatus (not illustrated) such as a router.

The camera 50 may be a body camera and a wearable camera worn by a person. A person wearing the camera 50 may be, for example, a police officer, a security guard, and the like. Furthermore, the camera 50 may be a camera for crime prevention or surveillance being installed at a street corner, or inside and outside a building such as a facility, a store, and a house.

The camera 50 may include a mechanism for performing control of an orientation of a camera main body and a lens, zooming control, focusing control, and the like by following a movement of a person.

An image captured and generated by the camera 50 is transmitted from the edge 100 to the processing apparatus 200, but may not be directly transmitted from the edge 100, and may be an image delayed by a predetermined time. An image generated by the camera 50 may be once stored in the storage apparatus 120, and may be read by the processing apparatus 200 from the storage apparatus 120 successively, for each predetermined interval, or at a predetermined timing.

<Hardware Configuration Example>

Figure 4:
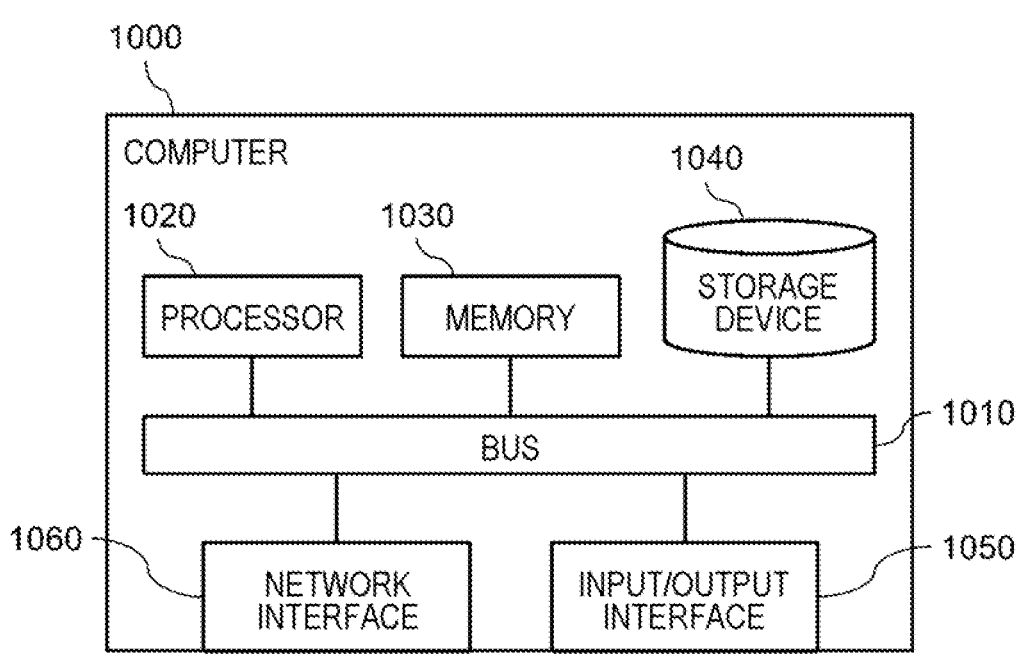
FIG. 4 is a block diagram illustrating a hardware configuration of a computer that achieves each apparatus included in the image processing system.

FIG. 4 is a block diagram illustrating a hardware configuration of a computer 1000 that achieves each apparatus included in the image processing system 1. In other words, each of the edge 100, the camera 50 included in the edge 100, and the processing apparatus 200 in FIG. 3 is achieved by the computer 1000. Further, a management apparatus 300 described in an example embodiment described below is also achieved by the computer 1000.

The computer 1000 includes a bus 1010, a processor 1020, a memory 1030, a storage device 1040, an input/output interface 1050, and a network interface 1060.

The bus 1010 is a data transmission path for allowing the processor 1020, the memory 1030, the storage device 1040, the input/output interface 1050, and the network interface 1060 to transmit and receive data with one another. However, a method for connecting the processor 1020 and the like to one another is not limited to bus connection.

The processor 1020 is a processor achieved by a central processing unit (CPU), a graphics processing unit (GPU), and the like.

The memory 1030 is a main storage apparatus achieved by a random access memory (RAM) and the like.

The storage device 1040 is an auxiliary storage apparatus achieved by a hard disk drive (HDD), a solid state drive (SSD), a memory card, a read only memory (ROM), or the like. The storage device 1040 stores a program module that achieves each function (for example, the determination unit 12, the mask processing unit 14, and the deletion unit 16, and an image generation unit 102, a transmission unit 104, an image processing unit 202, a display processing unit 204, a decision unit 206, a classification unit 208, a storage processing unit 210, a storage processing unit 302, and a transmission unit 304 that will be described below, and the like) of each apparatus of the image processing system 1. The processor 1020 reads each program module onto the memory 1030 and executes the program module, and each function associated with the program module is achieved. Further, the storage device 1040 may also store each piece of data of the storage apparatus 120, the storage apparatus 220, and a storage apparatus 320 described below.

The program module may be stored in a storage medium. The storage medium that stores the program module may include a non-transitory tangible medium usable by the computer 1000, and a program code readable by the computer 1000 (the processor 1020) may be embedded in the medium.

The input/output interface 1050 is an interface for connecting the computer 1000 and various types of input/output equipment. The input/output interface 1050 also functions as a communication interface that performs short-range wireless communication, such as Bluetooth (registered trademark) and Near Field Communication (NFC).

The network interface 1060 is an interface for connecting the computer 1000 to a communication network. The communication network is, for example, a local area network (LAN) and a wide area network (WAN). A method of connection to the communication network by the network interface 1060 may be wireless connection or wired connection.

Then, the computer 1000 is connected to necessary equipment (for example, a display, a touch panel, an operation unit, a camera, a speaker, a microphone, and the like) via the input/output interface 1050 or the network interface 1060.

Each component of each apparatus of the image processing system 1 in FIG. 1 and an image processing system 1 according to each of the other example embodiments described below is achieved by any combination of hardware of the computer 1000 in FIG. 4 and software. Then, various modification examples of an achievement method and an apparatus thereof are understood by a person skilled in the art. A functional block diagram illustrating each apparatus of the image processing system 1 according to each of the example embodiments illustrates a block of logical functional units instead of a configuration of hardware units.

<Functional Configuration Example>

Figure 5:
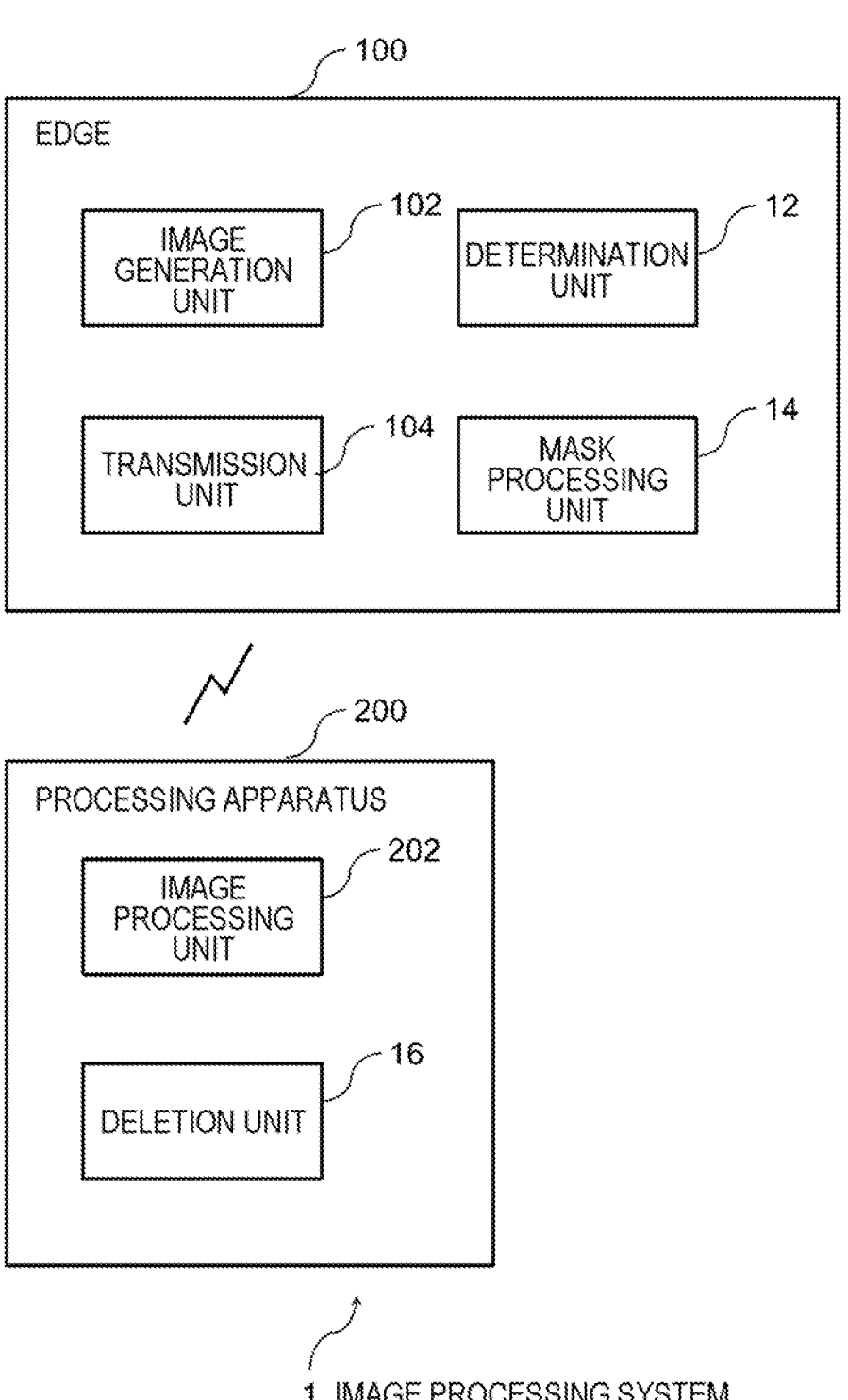
FIG. 5 is a functional block diagram illustrating a logical configuration example of an edge and a processing apparatus.

A functional configuration example of each apparatus of the image processing system 1 according to the example embodiment will be described below. FIG. 5 is a functional block diagram illustrating a logical configuration example of the edge 100 and the processing apparatus 200.

The edge 100 includes the image generation unit 102, the determination unit 12, the mask processing unit 14, and the transmission unit 104. The processing apparatus 200 includes the image processing unit 202 and the deletion unit 16.

In the edge 100, the image generation unit 102 generates an image.

The determination unit 12 determines a person included in the image. A determination method of a person included in an image is not particularly limited, but, for example, it is conceivable that the determination unit 12 performs comparison processing with an image during a fixed time (for example, before and after a few seconds) in a series of images (frames), performs object recognition processing on a region in which a change is detected, and determines a "person". At this time, the determination unit 12 does not perform authentication processing of determining who the "person" is.

The mask processing unit 14 performs mask processing on a face region including at least a part of a face of the determined person. Here, the mask processing unit 14 determines an upper region of a body of the determined person 40 (FIG. 2) as the face region 34 of the person, and performs the mask processing on the face region 34. The determination unit 12 and the mask processing unit 14 are the same as those in FIG. 1.

The transmission unit 104 transmits, to the processing apparatus 200, an image after the mask processing is performed by the mask processing unit 14 on the image generated by the image generation unit 102.

In the processing apparatus 200, the image processing unit 202 receives the image transmitted from the edge 100, and performs image processing of the image. The deletion unit 16 performs deletion of an unnecessary portion from the image, based on a result of the image processing.

The image processing unit 202 uses the image received from the edge 100, and performs a behavior analysis of the person in the image by the image processing.

Behavior being an analysis target is, for example, abnormal behavior of a person. The abnormal behavior includes a criminal act, suspicious behavior, and behavior of a victim. Specifically, various types of abnormal behavior of a person are conceivable, and include, for example, behavior related to (attempted) murder, injury, robbery, theft, abduction, pickpocketing, extortion, blackmail, an argument, assault, an illicit sale, shoplifting, drug use, molestation, illegal gambling, obstruction of performance of public duty, road traffic act violation, hit and run, dangerous driving, terrorism, and the like, which are not limited thereto.

A technique for the behavior analysis is not particularly limited, and various techniques can be used.

For behavior being an analysis target, a configuration for receiving a specification of a user may be included. For example, the image processing unit 202 can display, on a display (not illustrated) of the processing apparatus 200, a screen that receives a specification, receive an operation of a user interface (UI) that receives selection from among a plurality of behaviors included in the screen, and receive a specification of at least one behavior. Then, the image processing unit 202 may perform the behavior analysis on the behavior in which the specification of the user is received, and detect the behavior.

Further, the "person being the target" when the "unnecessary portion" described above is determined is, for example, a person detected to be performing abnormal behavior as a result of the behavior analysis by the image processing unit 202. In other words, a person detected to be performing abnormal behavior as a result of the behavior analysis is the "person being the target", and an image including the person is a "necessary portion". On the other hand, an image in which the "person being the target" is not captured is the "unnecessary portion". However, even in an image in which the "person being the target" is not captured, an image for a predetermined time before and after an image in which the "person being the target" being captured is detected may be the "necessary portion".

The predetermined time is not particularly limited, but may be, for example, 10 minutes, 30 minutes, a few hours, or one day to a few days. For example, the predetermined time may be changed depending on a content of behavior detected by the behavior analysis. For example, in a case of a crime considered to need a preparation such as a preliminary survey in advance, the predetermined time may be set long in order to be able to confirm a situation of a site before the crime occurs.

Furthermore, as another example of the "unnecessary portion", the comparison processing with an image during a fixed time (for example, before and after a few seconds) may be performed in a series of images (frames), and an image with no change may be set as the "unnecessary portion". The comparison processing may be performed by the image processing unit 202.

Further, in the edge 100, the image generation unit 102 may separate an image into an image of a background and an image of a person. The transmission unit 104 may transmit the image of the person to the processing apparatus 200.

In other words, the transmission unit 104 may not transmit the image of the background to the processing apparatus 200.

The image generation unit 102 may separate an image into images of a background and a person, and then store the images in the storage apparatus 120 in association with each other. With this configuration, information that determines where a person included in an image is present can be removed and transmitted, and thus privacy of a person can be protected.

Note that, a separated background image may be able to be transmitted from the edge 100 in response to a request from the processing apparatus 200.

<Operation Example>

Figure 6:
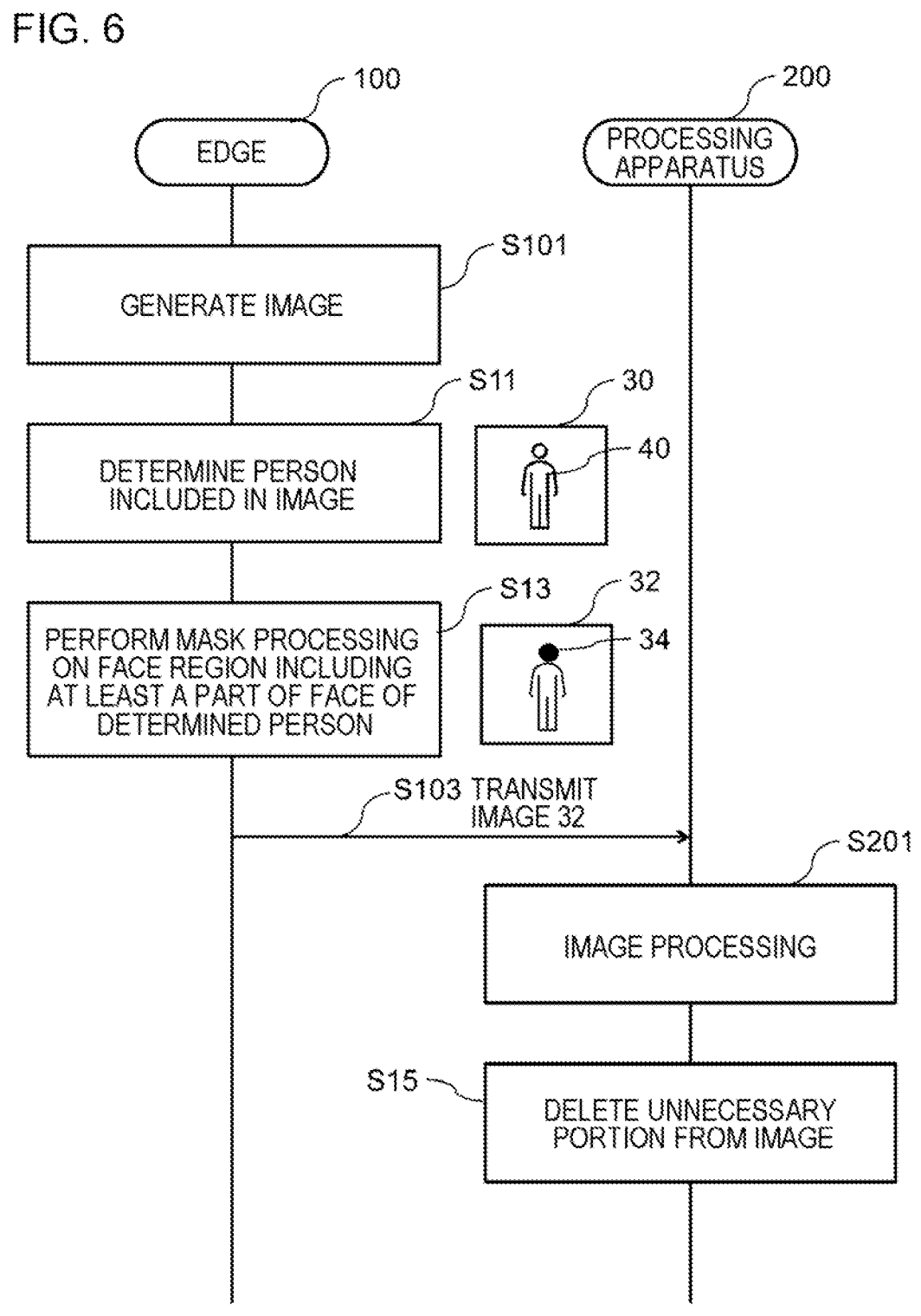

FIG. 6 is a flowchart illustrating an operation example of the image processing system 1 according to the example embodiment. The operation example of the image processing system 1 according to the example embodiment will be described below. Processing of the edge 100 and processing of the processing apparatus 200 may be performed in non-synchronization with each other. Further, when the camera 50 is fixed, the comparison processing with an image during a fixed time (for example, before and after a few seconds) may be performed in a series of images (frames) of a capturing image, and processing of the determination unit 12 may start when a change is detected.

First, the image generation unit 102 generates an image in the edge 100 (step S101). The image may be a moving image, and may include, for example, a plurality of image frames. The determination unit 12 determines a person 40 included in an image 30 (step S11).

Then, the mask processing unit 14 performs mask processing on a face region 34 including at least a part of a face of the determined person (step S13). Then, the transmission unit 104 transmits, to the processing apparatus 200, an image 32 after the mask processing is performed by the mask processing unit 14 on the image 30 generated by the image generation unit 102 (step S103).

FIG. 7 is a diagram illustrating a data structure example of the image 32. For example, an image captured by a certain camera 50 (camera ID is C0101) includes a plurality of image frames, and each of the frames includes at least capturing time information. However, the capturing time information may not be associated with each of the frames, and the capturing time information may be associated with each set of a plurality of frames. Note that, as illustrated in the diagram, the capturing time information may be information indicating a date and time.

A flag A being set to 1 and indicating that the mask processing is performed is associated with an image frame of the image 32 subjected to the mask processing by the mask processing unit 14. Herein, the flag A of an image not subjected to the mask processing remains as 0.

In other words, the mask processing unit 14 associates, with an image frame of the image 32 subjected to the mask processing, the flag A being set to 1 and indicating that the mask processing is performed, and stores the image 32 as the image 32 after the mask processing in the storage apparatus 120.

In the processing apparatus 200, the image processing unit 202 receives the image 32 transmitted from the edge 100, and performs image processing of the image 32 (step S201). Specifically, the image processing unit 202 performs a behavior analysis of the person in the image 32 by the image processing. The image processing unit 202 extracts an image including a person performing abnormal behavior as a result of the behavior analysis.

FIG. 8 is a diagram illustrating a data structure example of the image 32 after the behavior analysis. A flag B being set to 1 and indicating that a person performing abnormal behavior is detected is associated with an image frame of the image 32 including the person performing the abnormal behavior as a result of the behavior analysis by the image processing unit 202.

The deletion unit 16 performs deletion of an unnecessary portion from the image, based on a result of the image processing (step S15). For example, the deletion unit 16 may delete, as the unnecessary portion, a frame of a portion excluding: a frame to which the flag B is set; and a frame for a predetermined time before and after the frame. Then, the deletion unit 16 may store the image 32 after the deletion in a storage means (for example, the storage apparatus 220).

As described above, according to this image processing system 1, the edge 100 includes the image generation unit 102, the determination unit 12, the mask processing unit 14, and the transmission unit 104, and the processing apparatus 200 includes the image processing unit 202 and the deletion unit 16.

In the edge 100, the image generation unit 102 generates an image. The determination unit 12 determines a person included in the image. The mask processing unit 14 performs mask processing on a face region including at least a part of a face of the determined person. The transmission unit 104 transmits, to the processing apparatus 200, an image after the mask processing is performed by the mask processing unit 14 on the image generated by the image generation unit 102. In the processing apparatus 200, the image processing unit 202 receives the image transmitted from the edge 100, and performs image processing of the image. The deletion unit 16 performs deletion of an unnecessary portion from the image, based on a result of the image processing.

With this configuration, a state where information that can determine an individual included in an image, for example, information about a face is not included can be obtained on the edge 100 side, and thus privacy of an individual of a person captured in a capturing image can be reliably protected. Furthermore, according to this configuration, an unnecessary portion is deleted, and thus a capacity of the storage apparatus 220 that stores an image can be reduced.

Specifically, the determination unit 12 determines a person 40 by recognizing a "person" included in the image as an object. In other words, the determination unit 12 does not perform authentication processing such as personal determination. Furthermore, the mask processing unit 14 determines an upper region of a body of the determined person 40 as the face region 34 of the person, and performs the mask processing on the face region 34. Therefore, the image processing system 1 can perform concealment on the image without performing analysis processing on the face image of the person, and reliable protection for privacy of an individual can be assured.

Second Example Embodiment

Figure 9:
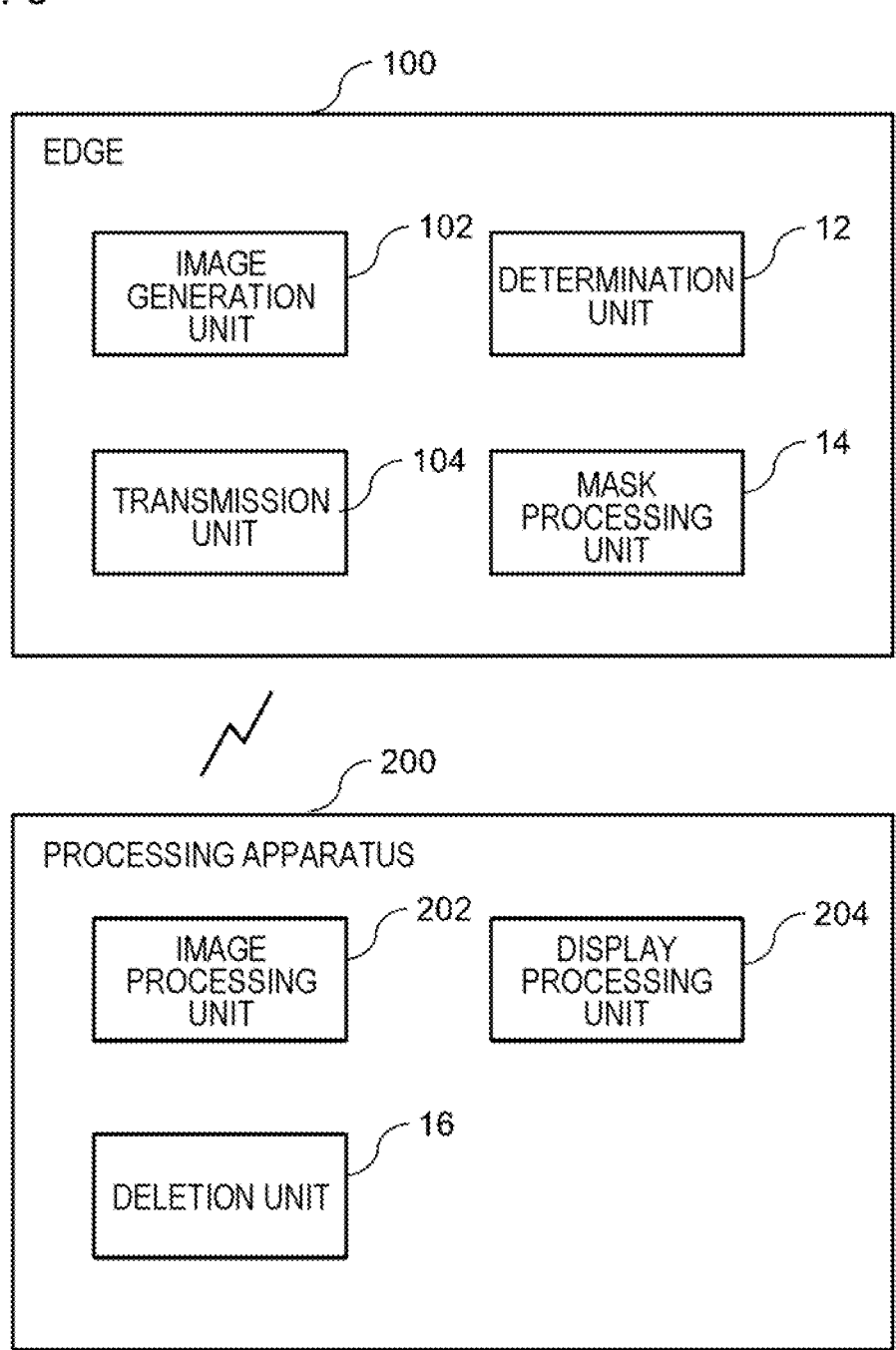
FIG. 9 is a functional block diagram illustrating a logical configuration example of an edge and a processing apparatus of an image processing system according to an example embodiment.

FIG. 9 is a functional block diagram illustrating a logical configuration example of an edge 100 and a processing apparatus 200 of an image processing system 1 according to an example embodiment. The present example embodiment is the same as the first example embodiment described above except for a point that the processing apparatus 200 has a configuration for displaying an image after processing. Note that, the configuration of the present example embodiment may be combined as long as the present example embodiment is not inconsistent with at least any one of configurations of the other example embodiments other than the first example embodiment.

<Functional Configuration Example>

When abnormal behavior of a person is detected by a behavior analysis, a display processing unit 204 of the processing apparatus 200 displays, on a display means, an image for a predetermined time before and after and including the abnormal behavior. The display means is, for example, a display (not illustrated) of the processing apparatus 200. In another example, the display means may be a display (not illustrated) of a terminal (computer 1000) that can access a storage apparatus 220. Hereinafter, the display means will be described as the display of the processing apparatus 200. The display is not particularly limited, but is, for example, a liquid crystal display, an organic electroluminescence (EL) display, and the like.

Further, before an operation of displaying an image in the processing apparatus 200, a user preferably logs into the image processing system 1 by using authentication information in the processing apparatus 200. Only a user who succeeds in a login can preferably use the image processing system 1 by using the processing apparatus 200.

Figure 10:
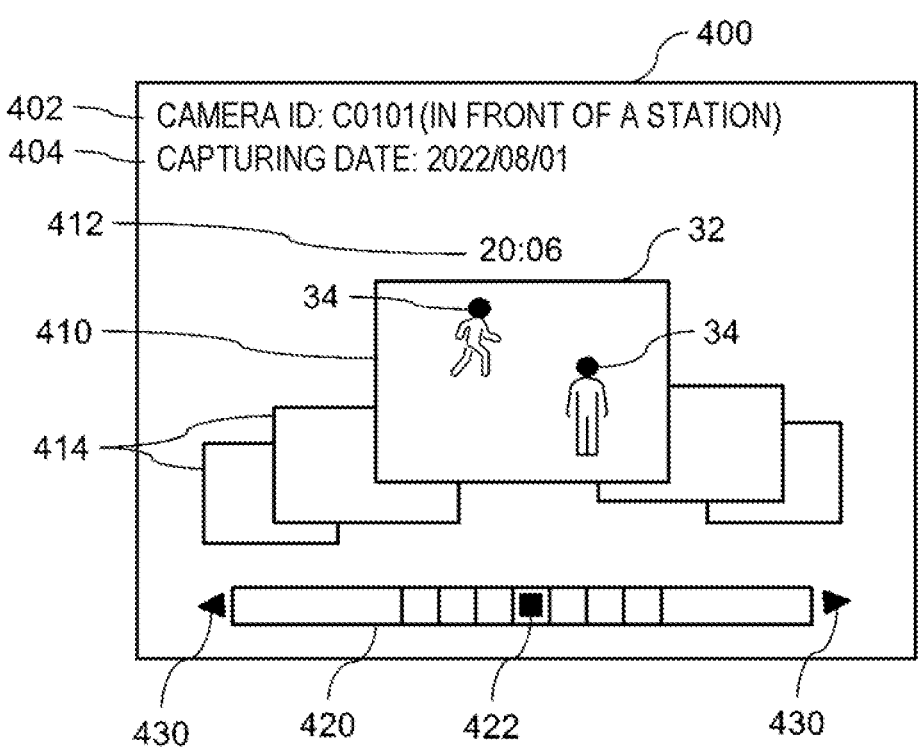
FIG. 10 is a diagram illustrating one example of a screen.

FIG. 10 is a diagram illustrating one example of a screen 400. The display processing unit 204 displays the screen 400 on the display of the processing apparatus 200. The screen 400 includes a capturing place display portion 402, a capturing date display portion 404, an image display portion 410, a capturing time display portion 412, a before-after image display portion 414, a timeline display portion 420, a display position display portion 422, and a movement button 430. For example, the screen 400 may be able to be displayed in such a way as to be able to continuously view an image frame for each image file of a video captured by a certain camera 50 in a certain time period on a certain day. Alternatively, a moving image may be reproduced and displayed, and an operation such as reproduction, a stop, a pause, reverse reproduction, slow reproduction, and frame-by-frame advance of a moving image may be able to be performed.

The capturing place display portion 402 displays at least any one of identification information about the camera 50 that captures the video of the image file, and information indicating a capturing place of the camera 50. Note that, for example, in a case of the fixed camera 50, the information indicating the capturing place of the camera 50 is stored in advance in a storage apparatus 120 or the storage apparatus 220 by associating information indicating an installation place of the camera 50 with the identification information about the camera 50. In a case of a wearable camera, the edge 100 may acquire position information acquired by using a global positioning system (GPS) reception function of the wearable camera, or a smartphone, a wearable terminal, or the like of a person wearing the wearable camera, and may store, in the storage apparatus 120, the position information in association with an image together with time information.

The capturing date display portion 404 displays a date on which an image being displayed is captured.

The image display portion 410 displays an image 32 being an image in which a person being a target is detected, and having mask processing being performed on a face region 34 including a face of the person. As illustrated in the diagram, when a plurality of persons are included, the mask processing is performed on the face region 34 of each of the persons. The capturing time display portion 412 displays a capturing time of the image 32 being displayed on the image display portion 410.

The before-after image display portion 414 displays an image before and after the image 32. The timeline display portion 420 indicates a position in a time axis of a series of image frames of an image file being displayed. The display position display portion 422 indicates a position on the time axis in the file of an image frame being displayed on the image display portion 410. The display position display portion 422 may have a function of a UI that receives a change operation of a display position (time). In other words, a user may be able to change an image frame to be displayed on the image display portion 410 by moving the display position display portion 422 on a timeline.

The movement button 430 is a UI that receives an operation for moving a position (time) of an image file to be displayed on the timeline display portion 420 forward and backward.

Furthermore, for an image frame to which the flag B described in FIG. 8 is set, the screen 400 may further include a message display portion indicating that a person performing abnormal behavior is present in an image, a display portion in which an image display or an emphasized display for calling attention is performed, and the like.

Various timings for displaying the screen 400 by the display processing unit 204 are conceivable, which are not limited thereto. For example, when a person being a target is detected by the image processing unit 202, the display processing unit 204 may automatically display an image in which the person is detected. Alternatively, the display processing unit 204 may perform a display at a timing at which an operation of a user is received. Alternatively, when a person being a target is detected by an image processing unit 202, the detection may be notified to a user, and the display processing unit 204 may perform a display at a timing at which an operation of the notified user is received.

As described above, according to this image processing system 1, the processing apparatus 200 includes the display processing unit 204 that displays, on the display of the processing apparatus 200, an image for a predetermined time before and after and including abnormal behavior when abnormal behavior of a person is detected by a behavior analysis.

With this configuration, an effect similar to that in the example embodiment described above can be achieved, and, furthermore, an image subjected to mask processing can be displayed. Thus, while protecting privacy of an individual of a person captured in a capturing image, a user can view the image.

Third Example Embodiment

Figure 11:
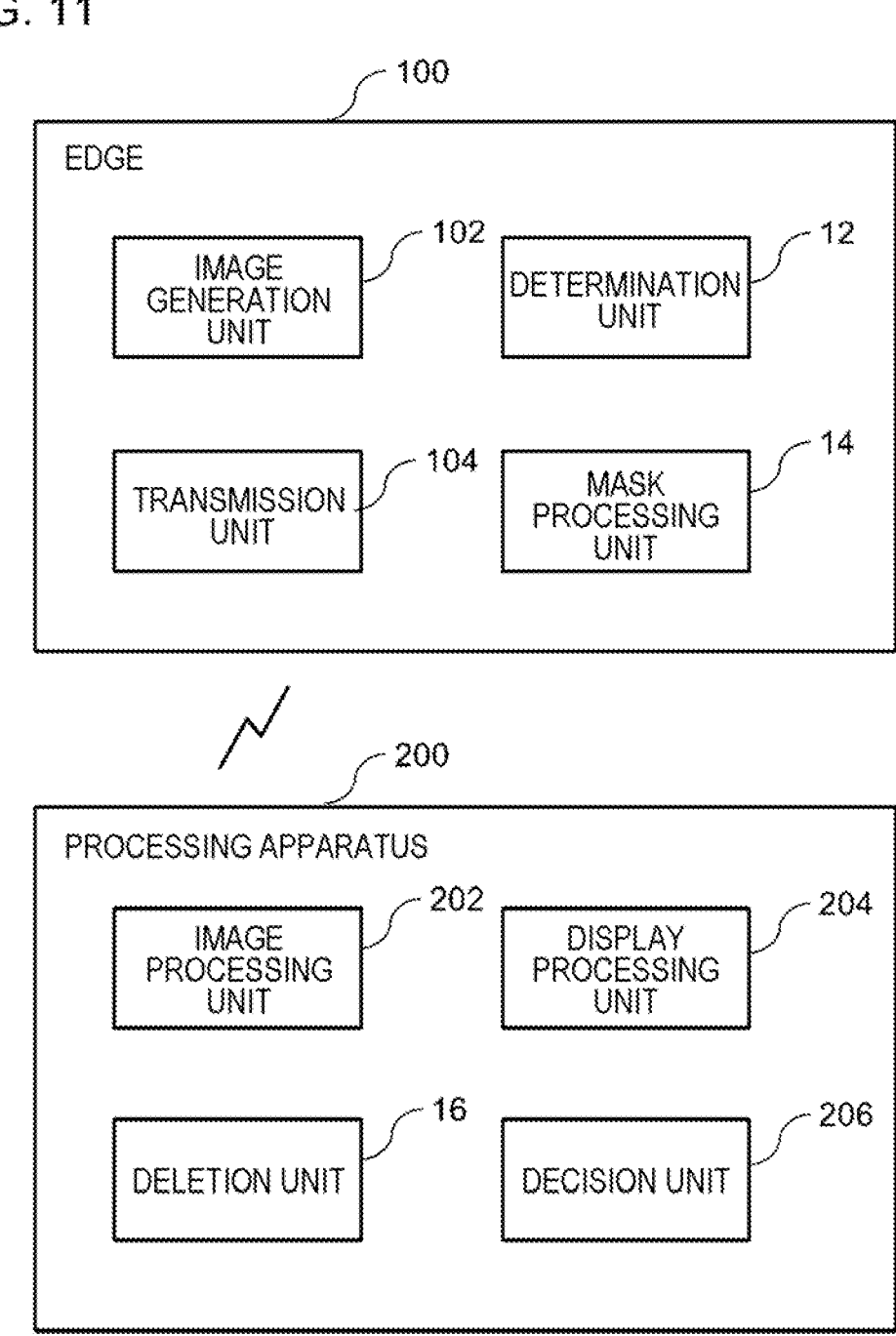
FIG. 11 is a functional block diagram illustrating a logical configuration example of an edge and a processing apparatus of an image processing system according to an example embodiment.

FIG. 11 is a functional block diagram illustrating a logical configuration example of an edge 100 and a processing apparatus 200 of an image processing system 1 according to an example embodiment. The present example embodiment is the same as the second example embodiment described above except for a point that mask processing that can be canceled is performed, and the processing apparatus 200 has a configuration for displaying an image in which masking is canceled. Note that, the configuration of the present example embodiment may be combined as long as the present example embodiment is not inconsistent with at least any one of configurations of the other example embodiments other than the second example embodiment.

<Functional Configuration Example>

The processing apparatus 200 in FIG. 11 further includes a decision unit 206 in addition to the configuration in FIG. 9. The edge 100 has the same configuration as that in FIG. 9.

In the edge 100, a mask processing unit 14 performs mask processing in such a way that the mask processing can be canceled.

In the processing apparatus 200, the decision unit 206 decides whether a portion subjected to masking in a face region included in an image of for a predetermined time can be canceled.

A decision reference of whether masking can be canceled can be set by, for example, presence or absence of key information needed for canceling the masking. In other words, when the key information is received, the decision unit 206 decides that a portion subjected to the masking can be canceled. Details of the key information will be described in an example embodiment described below.

Then, in the processing apparatus 200, when the decision unit 206 decides that the masking can be canceled, a display processing unit 204 displays, on a display of the processing apparatus 200, an image in which the masking in the face region included in the image of for the predetermined time is canceled.

The image of for the predetermined time herein is an image for a predetermined time before and after an image including a person performing abnormal behavior. Further, the key information may include information indicating the predetermined time. Alternatively, the predetermined time may be a time specified by a user.

<Operation Example>

Figure 12:
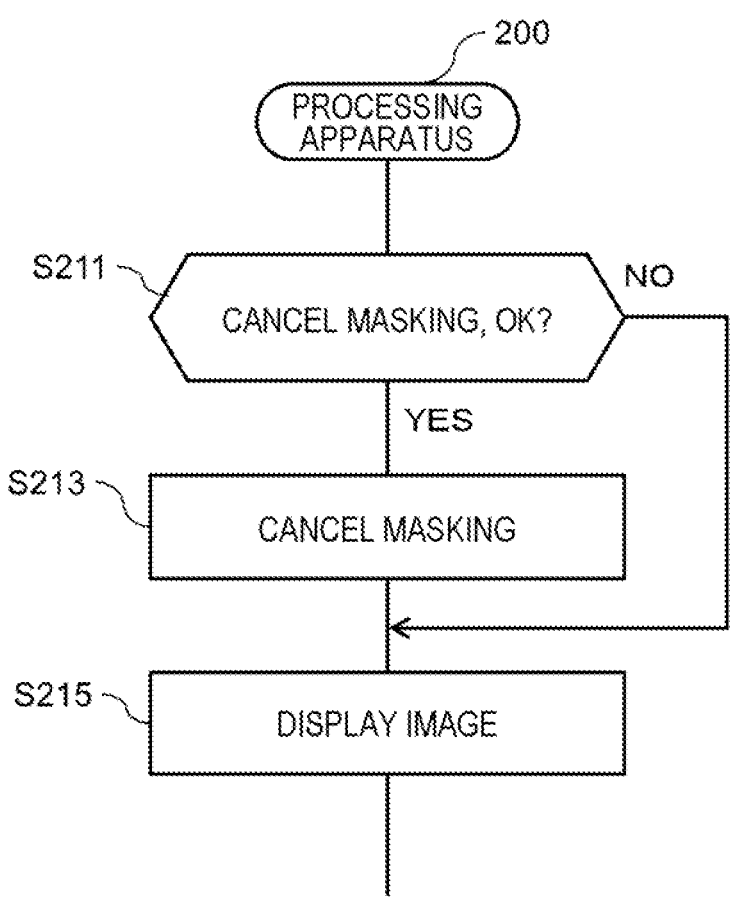
FIG. 12 is a flowchart illustrating an operation example of the image processing system.

FIG. 12 is a flowchart illustrating an operation example of the image processing system 1.

For an image subjected to image processing by an image processing unit 202 and stored in a storage apparatus 220, this flow is performed at, for example, a timing at which a request operation of a user is received, and the like. Further, before this flow, in the flowchart in FIG. 6 described the example embodiment described above, the mask processing unit 14 performs, on a face region determined by a determination unit 12, the mask processing in such a way that the mask processing can be canceled (step S13 in FIG. 6).

Then, in the processing apparatus 200, the decision unit 206 decides whether a portion subjected to masking in a face region included in an image of for a predetermined time can be canceled (step S211). For example, when key information for canceling the masking in the face region included in the image of for the predetermined time is received, the decision unit 206 decides that the masking in the face region included in the image of for the predetermined time can be canceled (YES in step S211), and the processing proceeds to step S213. On the other hand, for example, when the key information for canceling the masking in the face region included in the image of for the predetermined time is not received, the decision unit 206 decides that the masking in the face region included in the image of for the predetermined time cannot be canceled (NO in step S211), step S213 is bypassed, and the processing proceeds to step S215.

In step S213, the display processing unit 204 cancels the masking in the face region included in the image of for the predetermined time. In step S215, the display processing unit 204 displays the image in which the masking is canceled on the display of the processing apparatus 200, and the like.

In other words, when the decision unit 206 decides that the masking can be canceled (YES in step S211), the display processing unit 204 cancels the masking in the face region included in the image of for the predetermined time (step S213), and displays the image in which the masking is canceled on the display of the processing apparatus 200, and the like (step S215). On the other hand, when the decision unit 206 decides that the masking cannot be canceled (NO in step S211), the display processing unit 204 displays the image on the display of the processing apparatus 200, and the like, while maintaining the mask processing on the image (step S215).

As described above, according to this image processing system 1, the mask processing unit 14 of the edge 100 performs mask processing in such a way that the mask processing can be canceled. Then, the processing apparatus 200 includes the decision unit 206 that decides whether a portion subjected to masking in a face region included in an image of for a predetermined time can be canceled. Then, when the decision unit 206 decides that the masking can be canceled, the display processing unit 204 displays, on the display of the processing apparatus 200, the image in which the masking in the face region included in the image of for the predetermined time is canceled.

With this configuration, an effect similar to that in the example embodiment described above can be achieved. Furthermore, whether masking of an image subjected to mask processing can be canceled is decided, and then, when the masking can be canceled, the image in which the masking is canceled can be displayed. Thus, when a decision reference is satisfied and a user is in need, the user can confirm a face of a person in the image.

Fourth Example Embodiment

Figure 13:
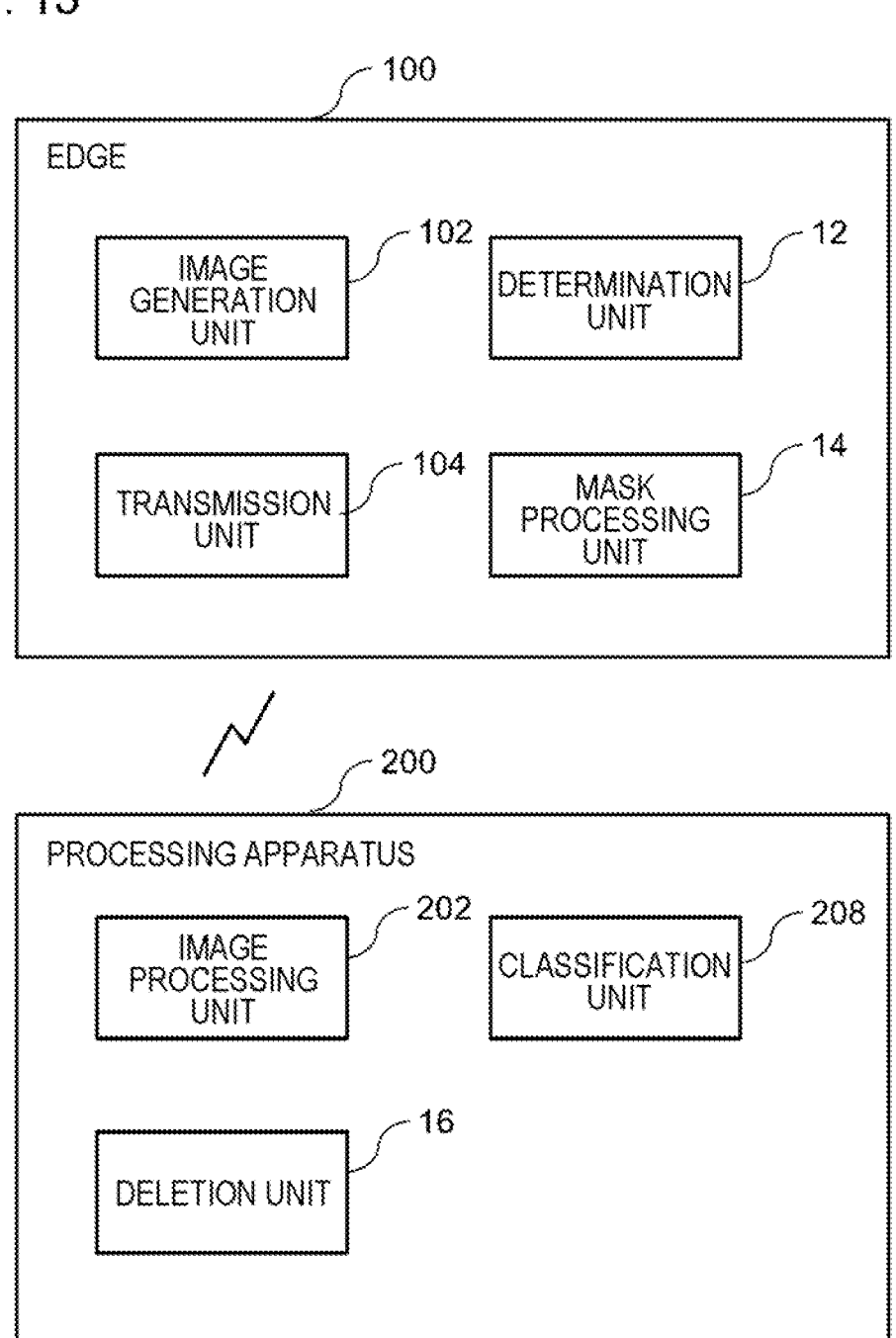
FIG. 13 is a functional block diagram illustrating a logical configuration example of an edge and a processing apparatus of an image processing system according to an example embodiment.

FIG. 13 is a functional block diagram illustrating a logical configuration example of an edge 100 and a processing apparatus 200 of an image processing system 1 according to an example embodiment. The present example embodiment is the same as the first example embodiment described above except for a point that the processing apparatus 200 has a configuration for classifying an image into a plurality of categories by using a result of a behavior analysis, and performing processing according to the category. Note that, the configuration of the present example embodiment may be combined as long as the present example embodiment is not inconsistent with at least any one of configurations of the other example embodiments other than the first example embodiment.

<Functional Configuration Example>

The processing apparatus 200 in FIG. 13 further includes a classification unit 208 in addition to the configuration in FIG. 5. The edge 100 has the same configuration as that in FIG. 5.

The classification unit 208 classifies an image into a plurality of categories by using a result of a behavior analysis.

The category may include, for example, a plurality of categories by level of illegality of behavior. For example, the classification may be performed in such a way that, in a descending order of the illegality, a first category includes terrorism, a second category includes murder, robbery, and abduction, a third category includes injury and theft, and a fourth category includes an argument, molestation, shoplift- ing, and the like.

Herein, an "image" is an image (for example, a frame) in which a result of a behavior analysis being a basis of classification of a category is acquired. When a plurality of persons are included in an image, a plurality of different abnormal behaviors are detected, and the behaviors are classified into a plurality of different categories, the image is preferably classified into a category having highest illegal- ity.

Furthermore, in the processing apparatus 200, a deletion unit 16 performs deletion of an unnecessary portion from an image according to a degree of priority of deletion deter- mined according to a category.

For example, in a case of the fourth category having low illegality described above, a degree of priority of deletion can be set high, and in a case of the first category having high illegality, a degree of priority of deletion can be set low. In this way, an image (frame) having a high degree of priority of deletion can be preferentially deleted from an image file. For example, a storage period of an image having a high degree of priority of deletion is set short, and a storage period of an image is set longer as a degree of priority of deletion decreases.

In this way, an image (frame) having a high degree of priority of deletion is deleted first, and an image (frame) having a low degree of priority of deletion is less likely to be deleted from an image file. In this way, while a necessary image (frame) is left, a capacity of an image file can be efficiently reduced.

Furthermore, in the processing apparatus 200, the classi- fication unit 208 may store, by category, an image classified into a plurality of categories in a storage apparatus 220. For example, the classification unit 208 creates a folder different for each category, and stores an image in a folder corre- sponding to a category.

Modification Aspect of Fourth Example Embodiment

Figure 14:
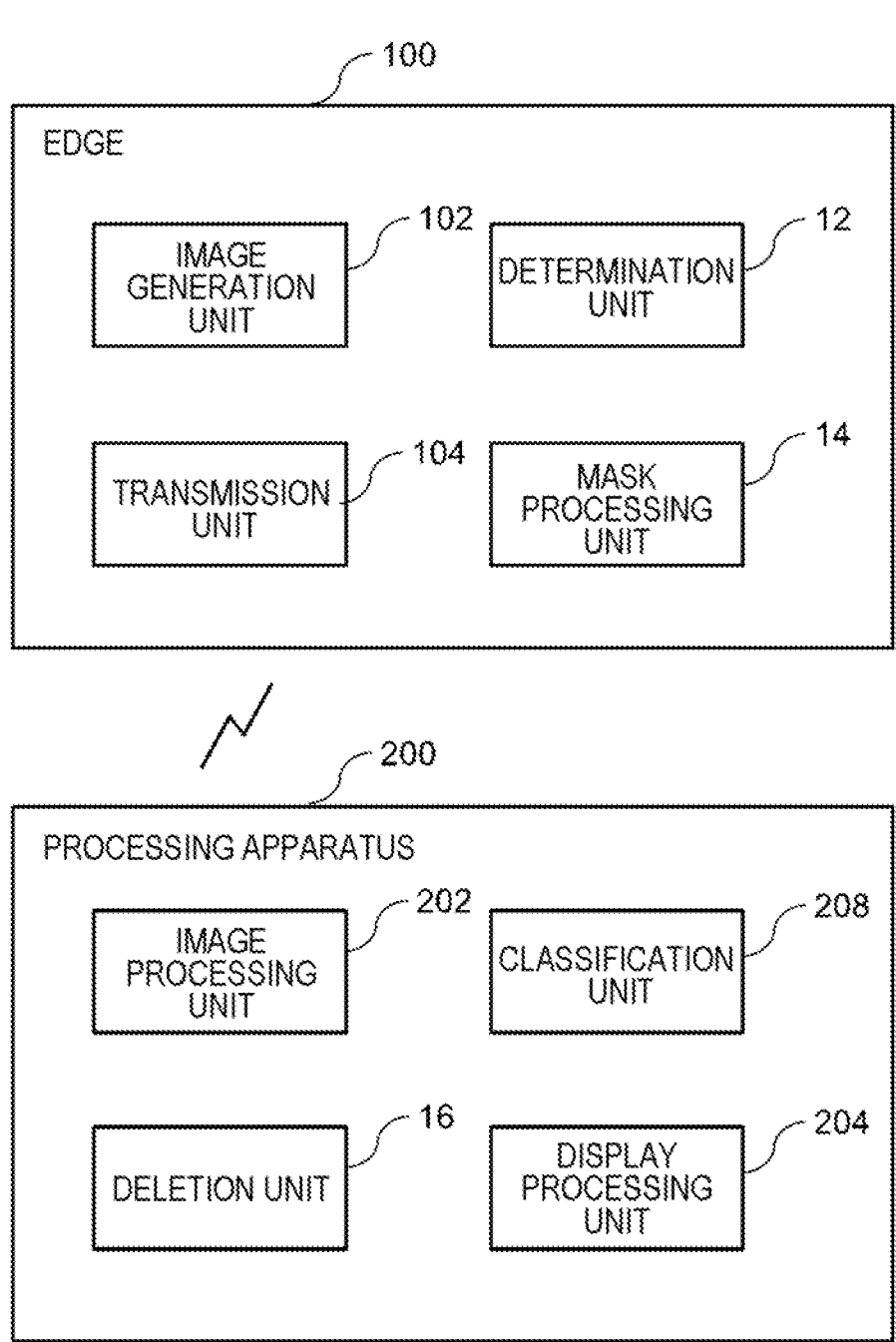
FIG. 14 is a functional block diagram illustrating a logical configuration example of the edge and the processing apparatus of the image processing system according to a modification aspect of the example embodiment.

FIG. 14 is a functional block diagram illustrating a logical configuration example of the edge 100 and the processing apparatus 200 of the image processing system 1 according to a modification aspect of the fourth example embodiment. In addition to the configuration of the processing apparatus 200 in FIG. 13, the display processing unit 204 according to the second example embodiment is further included.

The display processing unit 204 displays an image clas- sified by the classification unit 208 on a display means by category. For example, a UI that receives selection of a category may be included in a screen, and the display processing unit 204 may read, from the storage apparatus 220, an image classified into the category in which the selection is received, and display the image on a display of the processing apparatus 200.

Further, the display processing unit 204 may be able to display a summary image of a detected image side by side for each category. Alternatively, the display processing unit 204 may be able to display a summary image for each category side by side by region of an installation place of a plurality of cameras 50. Alternatively, the display processing unit 204 may be able to display a summary image for each region side by side by category.

As described above, according to this image processing system 1, the processing apparatus 200 includes the classi- fication unit 208 that classifies an image into a plurality of categories by using a result of a behavior analysis.

With this configuration, an effect similar to that in the example embodiment described above can be achieved, and, furthermore, an image can be classified and processed by using a result of the behavior analysis, and thus it is efficient to analyze the image. For example, an image can be stored by category and displayed by category, and thus work can be efficiently performed.

Fifth Example Embodiment

Figure 15:
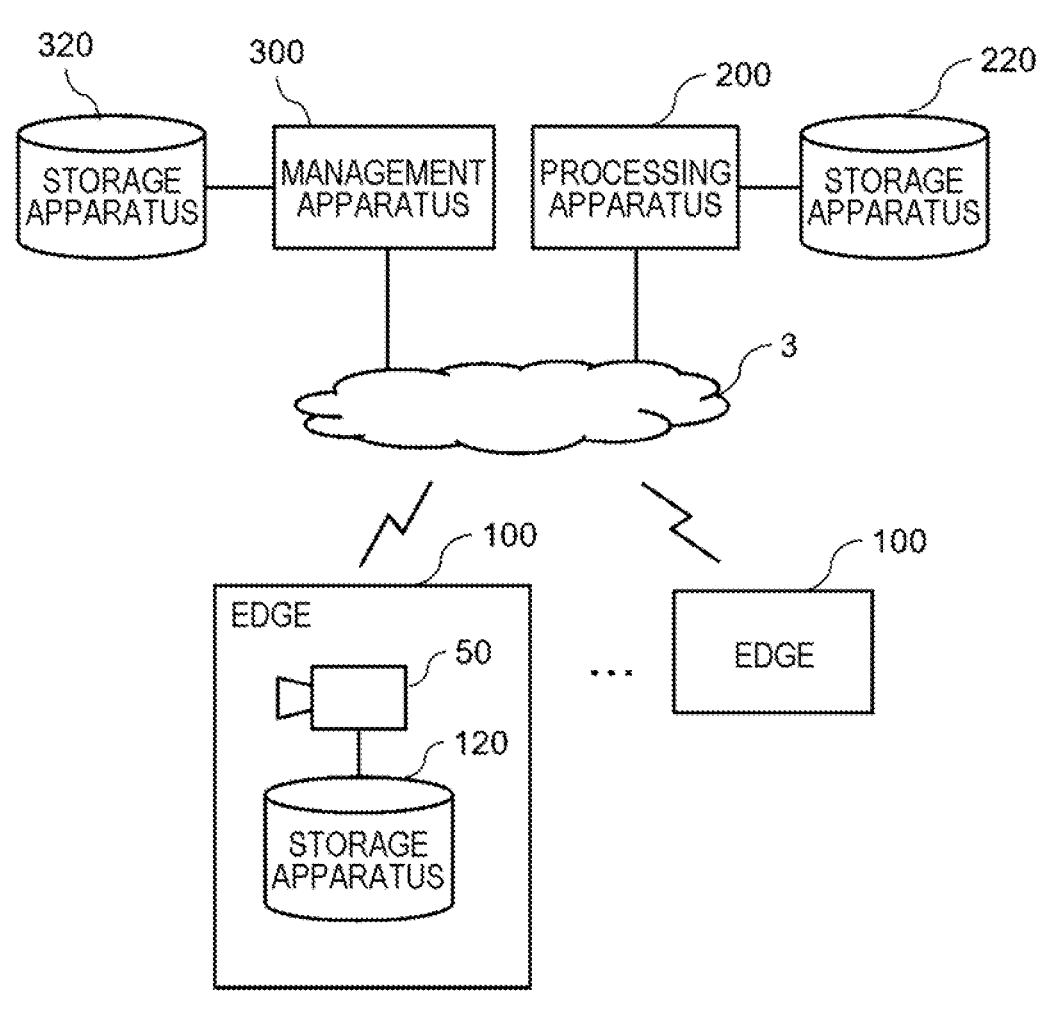
FIG. 15 is a diagram schematically illustrating a system configuration of an image processing system according to an example embodiment.

FIG. 15 is a diagram schematically illustrating a system configuration of an image processing system 1 according to an example embodiment. The present example embodiment is the same as the third example embodiment except for a point that a management apparatus 300 that manages an image is included. A configuration of an edge 100 and a processing apparatus 200 will be described below by using FIG. 11. Note that, the configuration of the present example embodiment may be combined as long as the present example embodiment is not inconsistent with at least any one of configurations of the other example embodiments other than the third example embodiment.

<System Overview>

The image processing system 1 in FIG. 15 further includes the management apparatus 300 in addition to the configuration in FIG. 3 described in the first example embodiment. The management apparatus 300 is connected to the edge 100 and the processing apparatus 200 via a communication network 3.

The management apparatus 300 is a computer including a storage apparatus 320. The storage apparatus 320 may be provided inside the management apparatus 300, or may be provided outside. In other words, the storage apparatus 320 may be hardware integral with the management apparatus 300, or may be hardware separated from the management apparatus 300.

The management apparatus 300 is, for example, an appa- ratus managed by an independent institution different from an institution that manages the processing apparatus 200. For example, the processing apparatus 200 is an apparatus managed by a police station and a security company, and the management apparatus 300 is an apparatus managed by a court.

<Functional Configuration Example>

A functional configuration example of the image process- ing system 1 will be described below by using FIG. 11.

In the edge 100, a mask processing unit 14 performs mask processing that can be canceled by key information. A transmission unit 104 transmits the key information to the management apparatus 300.

The key information is not particularly limited, but may be, for example, a character string including a predetermined number of digits of letters and numbers.

The transmission unit 104 transmits, to the processing apparatus 200, an image after the mask processing is per- formed by the mask processing unit 14 in such a way as to be able to be canceled by the key information, and also transmits the key information together with a capturing place and a capturing time of the image to the management apparatus 300.

Figure 16:
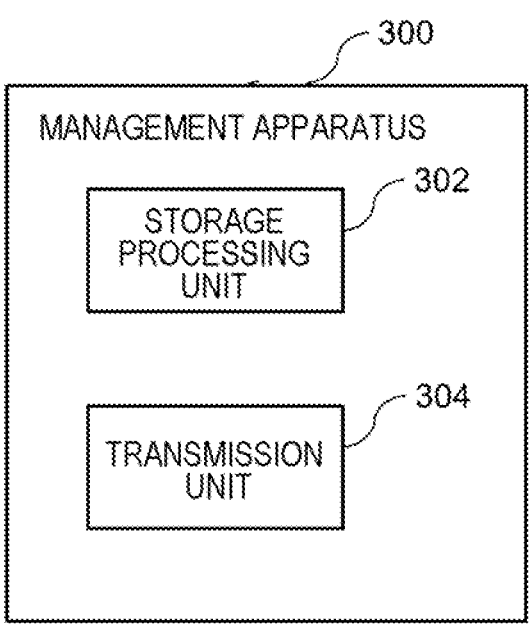
FIG. 16 is a functional block diagram illustrating a logical configuration example of a management apparatus according to the example embodiment.

FIG. 16 is a functional block diagram illustrating a logical configuration example of the management apparatus 300 according to the example embodiment. The management apparatus 300 includes a storage processing unit 302 and a transmission unit 304.

The storage processing unit 302 encrypts, with a capturing place and a capturing time of an image as a decryption key, key information received from the edge 100, and then stores the key information in association with the decryption key in the storage apparatus 320.

When the capturing place and the capturing time are received from the processing apparatus 200, the transmission unit 304 decrypts the key information by using the associated decryption key, and transmits the key information to the processing apparatus 200.

<Operation Example>

Figure 17:
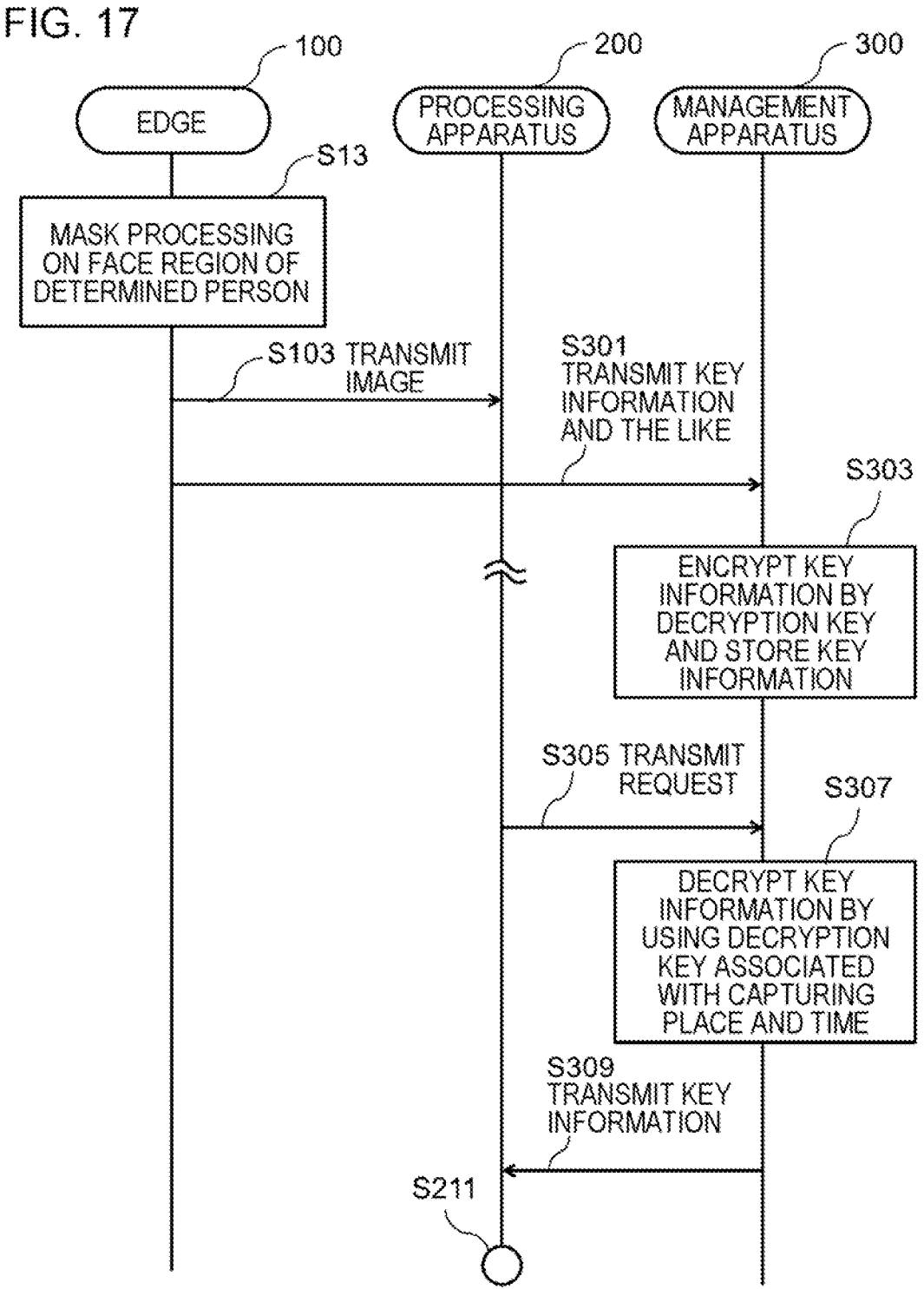
FIG. 17 is a flowchart illustrating an operation example of the image processing system according to the example embodiment.

FIG. 17 is a flowchart illustrating an operation example of the image processing system 1 according to the example embodiment.

Step S13 in FIG. 17 is performed after step S11 in FIG. 2 or 6 in the example embodiment described above. The mask processing unit 14 performs mask processing that can be canceled by key information (step S13). Then, the transmission unit 104 transmits, to the processing apparatus 200, an image after the mask processing is performed by the mask processing unit 14 in such a way as to be able to be canceled by the key information (step S103), and also transmits the key information together with a capturing place and a capturing time of the image to the management apparatus 300 (step S301).

In the processing apparatus 200, similarly to FIG. 6, the received image is processed by an image processing unit 202 and a deletion unit 16, and is stored in a storage apparatus 220 (not illustrated in FIG. 17).

In the management apparatus 300, the storage processing unit 302 encrypts, with the capturing place and the capturing time of the image as a decryption key, the key information received from the edge 100, and then stores the encrypted key information in association with the decryption key in the storage apparatus 320 (step S303).

Figure 18:
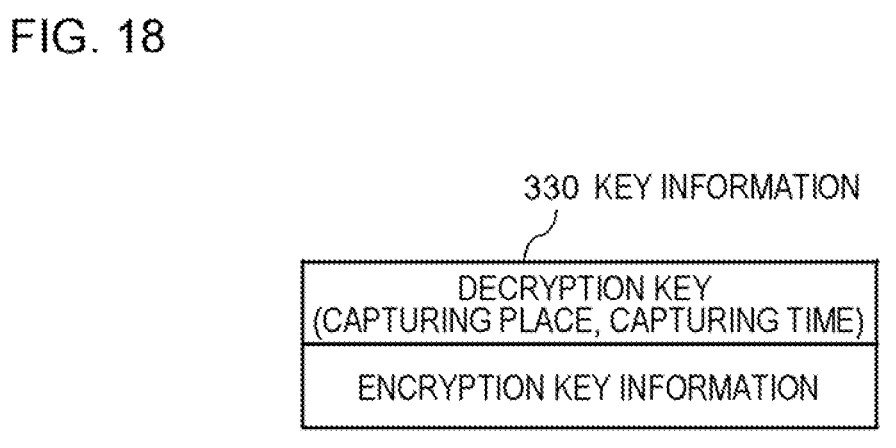

FIG. 18 is a diagram illustrating a data structure example of key information 330. In the key information 330, encrypted key information is stored in association with a capturing place and a capturing time as a decryption key.

Returning to FIG. 17, in the processing apparatus 200, for example, a user can perform an operation of requesting cancellation of masking for an image in which a person performing abnormal behavior is detected by a behavior analysis by the image processing unit 202. For example, the screen 400 in FIG. 10 includes an operation button (not illustrated) that requests cancellation of masking of the image 32 being displayed on the image display portion 410. When pressing of the operation button by a user is received, information about the capturing place and the capturing time of the image is transmitted from the processing apparatus 200 to the management apparatus 300 as a request for canceling the masking of the image (step S305). For example, a case where a user such as the police requests, from a court for an investigation, cancellation of masking for an image classified into a category having high illegality in the fourth example embodiment, and the like are assumed. For example, the image in which the masking is canceled is used for creating an investigation warrant and creating a record.

Further, in another example, in the processing apparatus 200, a screen including a UI that receives a specification of a capturing place and a capturing time may be displayed, and the specification of the capturing place and the capturing time may be received.

In the management apparatus 300, when the capturing place and the capturing time are received from the processing apparatus 200, the transmission unit 304 reads the decryption key associated with the capturing place and the capturing time, and the key information from the key information 330 stored in the storage apparatus 320, decrypts the key information by using the decryption key (step S307), and transmits the decrypted key information to the processing apparatus 200 (step S309).

In the processing apparatus 200, when the key information is received from the management apparatus 300, the processing proceeds to step S211 in the flowchart in FIG. 12. In response to reception of the key information, a decision unit 206 decides that a portion subjected to the masking in a face region included in an image of for a predetermined time can be canceled (YES in step S211). Then, a display processing unit 204 cancels the masking in the face region included in the image of for the predetermined time (step S213), and displays the image in which the masking is canceled on a display of the processing apparatus 200, and the like (step S215).

As described above, this image processing system 1 further includes the management apparatus 300. In the edge 100, the mask processing unit 14 performs mask processing that can be canceled by key information. The transmission unit 104 transmits, to the processing apparatus 200, an image after the mask processing is performed by the mask processing unit 14 in such a way as to be able to be canceled by the key information, and also transmits the key information together with a capturing place and a capturing time of the image to the management apparatus 300. In the management apparatus 300, the storage processing unit 302 encrypts, with the capturing place and the capturing time of the image as a decryption key, the key information received from the edge 100, and then stores the key information in association with the decryption key in the storage apparatus 320.

When the capturing place and the capturing time are received from the processing apparatus 200, the transmission unit 304 decrypts the key information by using the associated decryption key, and transmits the key information to the processing apparatus 200.

With this configuration, an effect similar to that in the example embodiment described above can be achieved, and, furthermore, whether it is appropriate to perform cancellation processing of masking can be discriminated in the management apparatus 300 used by a user institution different from a user institution of the processing apparatus 200. Thus, privacy of an individual of a person included in a capturing image can be more reliably protected.

Modification Aspect 1 of Fifth Example
Embodiment

A modification aspect 1 of the fifth example embodiment is different from the fifth example embodiment in a point that key information for canceling masking, and, furthermore, an image of a background of the image are stored in association with each other, the image of the background of the image being a masking cancellation target is received when the key information is acquired, and the key information is returned when the image coincides with a stored image of the background.

In the edge 100, an image generation unit 102 separates an image into an image of a person determined by a determination unit 12, and an image of a background.

The transmission unit 104 further transmits, to the management apparatus 300, the image of the background together with key information.

Figure 19:
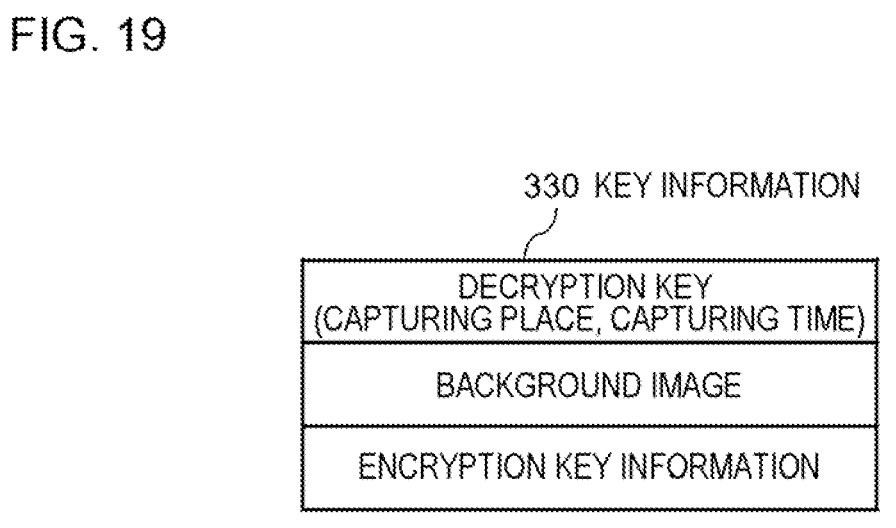

In the management apparatus 300, the storage processing unit 302 further stores, in association with the key information 330, the image of the background received from the edge 100. FIG. 19 illustrates a data structure example of the key information 330 according to the modification aspect 1. In this example, a background image and encrypted key information are stored in association with each other together with a decryption key in the key information 330.

Then, in the processing apparatus 200, the image of the background of the image is transmitted to the management apparatus 300 together with information about a capturing place and a capturing time of the image as a request for canceling masking of the image.

When the management apparatus 300 receives, from the processing apparatus 200, the image of the background together with the information about the capturing place and the capturing time, for example, the management apparatus 300 reads, from the key information 330 stored in the storage apparatus 320, the key information associated with at least one of the decryption key associated with the capturing place and the capturing time, and the image of the background. When the received image of the background and the stored image of the background coincide with each other, the transmission unit 304 decrypts the key information read by using the read decryption key, and transmits the decrypted key information to the processing apparatus 200.

The management apparatus 300 may further include a display processing unit (not illustrated) that displays, on a display (not illustrated) of the management apparatus 300, the image of the background received from the processing apparatus 200, also displays the image of the background read from the storage apparatus 320 side by side, and further displays a UI that receives an operation indicating that an operator visually confirms the backgrounds as the same. Then, when the operation indicating that the background images are the same is received, the transmission unit 304 may transmit decrypted key information to the processing apparatus 200.

Alternatively, the management apparatus 300 may further include a verification unit (not illustrated) that verifies, by image processing, the image of the background received from the processing apparatus 200 with the image of the background read from the storage apparatus 320. Then, when the background images coincide with each other, the transmission unit 304 may transmit decrypted key information to the processing apparatus 200.

In the processing apparatus 200, when the key information is received from the management apparatus 300, similarly to the fifth example embodiment, the display processing unit 204 displays an image in which the masking is canceled by using the key information.

As described above, according to this image processing system 1, the edge 100 includes the image generation unit 102 that separates an image into an image of a person determined by the determination unit 12, and an image of a background, and the transmission unit 104 that further transmits, to the management apparatus 300, the image of the background together with key information. The management apparatus 300 includes the storage processing unit 302 and the transmission unit 304.

When the management apparatus 300 receives, from the processing apparatus 200, the image of the background together with information about a capturing place and a capturing time, for example, the management apparatus 300 reads, from the key information 330 stored in the storage apparatus 320, the key information associated with at least one of a decryption key associated with the capturing place and the capturing time, and the image of the background. When the received image of the background and the stored image of the background coincide with each other, the transmission unit 304 decrypts the key information read by using the read decryption key, and transmits the decrypted key information to the processing apparatus 200.

With this configuration, an effect similar to that in the example embodiment described above can be achieved. Furthermore, when a background image transmitted from the processing apparatus 200 at a time of a request for key information, and a background image being stored in association with the key information coincide with each other, the key information can be transmitted to the processing apparatus 200. Thus, as compared to when only a capturing place and a capturing time are set as a decryption key, there is a possibility that security can be strengthened.

Modification Aspect 2 of Fifth Example Embodiment

A modification aspect 2 of the fifth example embodiment is different from the fifth example embodiment in a point that an image of a background of the image is further associated and stored as a decryption key of key information for canceling masking.

In the edge 100, the image generation unit 102 separates an image into an image of a person determined by the determination unit 12, and an image of a background.

The transmission unit 104 further transmits, to the management apparatus 300, the image of the background together with key information.

In the management apparatus 300, the storage processing unit 302 encrypts the received key information with, as a decryption key, the image of the background together with a capturing place and a capturing time received from the edge 100, and then stores the encrypted key information in association with the decryption key in the storage apparatus 320.

When the image of the background is received together with the capturing place and the capturing time from the processing apparatus 200, the transmission unit 304 reads the decryption key associated with the capturing place, the capturing time, and the background image, and the key information from the key information 330 stored in the storage apparatus 320, decrypts the key information by using the decryption key, and transmits the decrypted key information to the processing apparatus 200.

In the processing apparatus 200, when the key information is received from the management apparatus 300, similarly to the fifth example embodiment, the display processing unit 204 displays an image in which the masking is canceled by using the key information.

As described above, according to this image processing system 1, the edge 100 includes the image generation unit 102 that separates an image into an image of a person determined by the determination unit 12, and an image of a background, and the transmission unit 104 that further transmits, to the management apparatus 300, the image of the background together with key information. Further, the management apparatus 300 includes the storage processing unit 302 and the transmission unit 304. The storage processing unit 302 encrypts the received key information with, as a decryption key, the image of the background together with a capturing place and a capturing time received from the edge 100, and then stores the encrypted key information in association with the decryption key in the storage apparatus 320. When the image of the background is received together with the capturing place and the capturing time from the processing apparatus 200, the transmission unit 304 reads the decryption key associated with the capturing place, the capturing time, and the background image, and the key information from the key information 330 stored in the storage apparatus 320, decrypts the key information by using the decryption key, and transmits the decrypted key information to the processing apparatus 200. Then, in the processing apparatus 200, when the key information is received from the management apparatus 300, similarly to the fifth example embodiment, the display processing unit 204 displays an image in which masking is canceled by using the key information.

With this configuration, an effect similar to that in the example embodiment described above can be achieved. Furthermore, a background image is used as a decryption key, and thus, as compared to when only a capturing place and a capturing time are set as a decryption key, there is a possibility that security can be strengthened.

Sixth Example Embodiment

Figure 20:
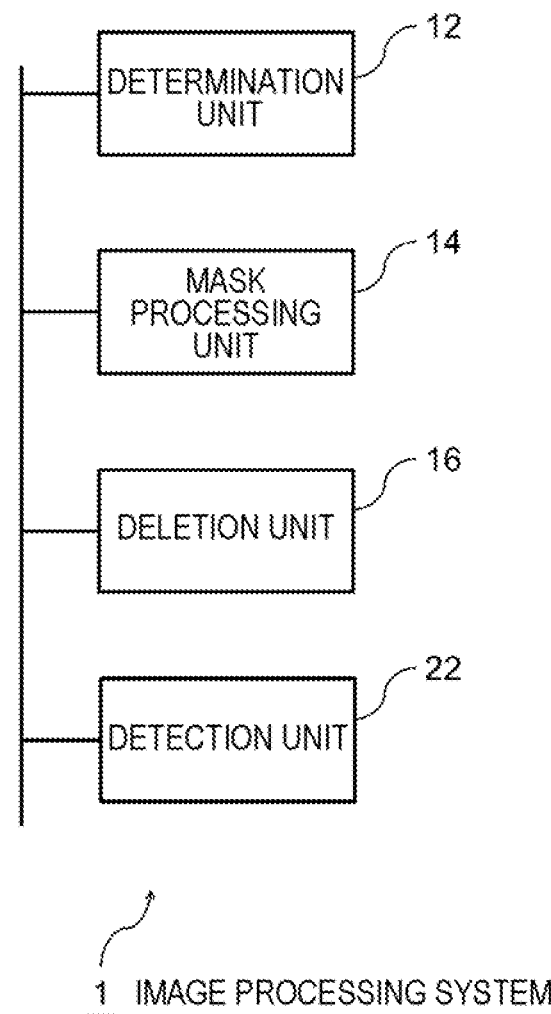
FIG. 20 is a diagram illustrating an overview of an information processing system according to an example embodiment.

FIG. 20 is a diagram illustrating an overview of an image processing system 1 according to an example embodiment.

The image processing system 1 according to the present example embodiment is different from the example embodiments described above in a point that a person being a target is searched from persons determined from an image, and, when the target person is detected, mask processing is performed on a person other than the target person.

The image processing system 1 according to the present example embodiment further includes a detection unit 22 in addition to the configuration in FIG. 1. Note that, the configuration of the present example embodiment may be combined as long as the present example embodiment is not inconsistent with at least any one of configurations of the other example embodiments other than the first example embodiment.

As a usage scene of the image processing system 1 according to the present example embodiment, a case where a target person is found from a capturing image of a camera 50, and the like are conceivable. A target person can be found by performing face authentication processing by using a face image of the target person. At this time, mask processing is performed in order to protect privacy of a person other than the target person.

<Functional Configuration Example>

The detection unit 22 detects, by face authentication processing, a target person from a person determined from an image by a determination unit 12.

When the target person is detected, a mask processing unit 14 performs mask processing on a person other than the target person.

A deletion unit 16 deletes an image in which the target person is not detected.

The detection unit 22 may detect a target person by authentication processing using biometric authentication information about a person in addition to the face authentication processing. The biometric authentication information includes, for example, at least any one of feature values such as an iris, a vein, an auricle, and a fingerprint. The detection unit 22 can extract feature information about a face or feature information about the biometric authentication information from a person determined from an image, and can perform the authentication processing by using the biometric authentication information or face authentication information.

Furthermore, the detection unit 22 may perform personal authentication processing by using information indicating at least one of features such as a gait, a stature, a shoulder width, a ratio of a body part, clothing (such as a shape, a color, and a material), a hairstyle (also including a hair color), a decoration item (such as a hat, glasses, and an accessory), and personal effects (such as a bag, an umbrella, and a stick) of a target person. Alternatively, the authentication processing may be performed by using feature information acquired by combining at least two pieces of the feature information.

<Operation Example>

Figure 21:
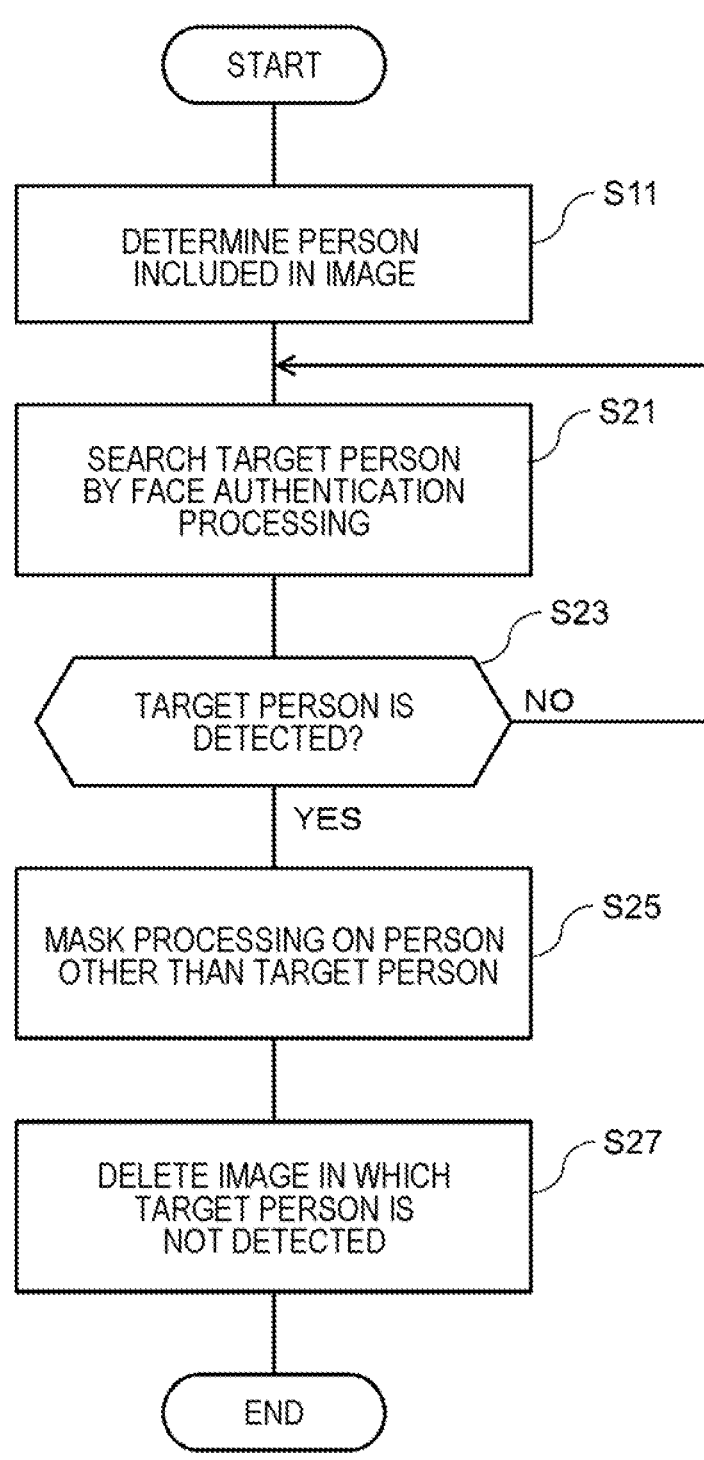
FIG. 21 is a flowchart illustrating an operation example of an image processing system according to the example embodiment.

FIG. 21 is a flowchart illustrating an operation example of the image processing system 1 according to the example embodiment.

The determination unit 12 determines a person included in an image (step S11). Then, the detection unit 22 searches, by face authentication processing, a target person from the persons determined from the image by the determination unit 12 (step S21). When the target person is detected (YES in step S23), the mask processing unit 14 performs mask processing on a person other than the target person (step S25). Until the target person is detected (NO in step S23), the processing returns to step S21 and the detection unit 22 repeats a search for the target person. The deletion unit 16 deletes an image in which the target person is not detected (step S27).

As described above, this image processing system 1 includes the determination unit 12, the mask processing unit 14, the deletion unit 16, and the detection unit 22. The determination unit 12 determines a person included in an image. The detection unit 22 detects, by face authentication processing, a target person from the persons determined from the image by the determination unit 12. When the target person is detected, the mask processing unit 14 performs mask processing on a person other than the target person. The deletion unit 16 deletes an image in which the target person is not detected.

With this configuration, an effect similar to that in the example embodiment described above can be achieved, and, furthermore, a state where information that can determine an individual included in an image, for example, information about a face is not included can be obtained. Thus, privacy of an individual of a person captured in a capturing image can be protected. Furthermore, according to this configuration, when a person being an investigation target is searched from an image, privacy of an individual of a person other than the person being the investigation target can also be protected.

Seventh Example Embodiment

Figure 22:
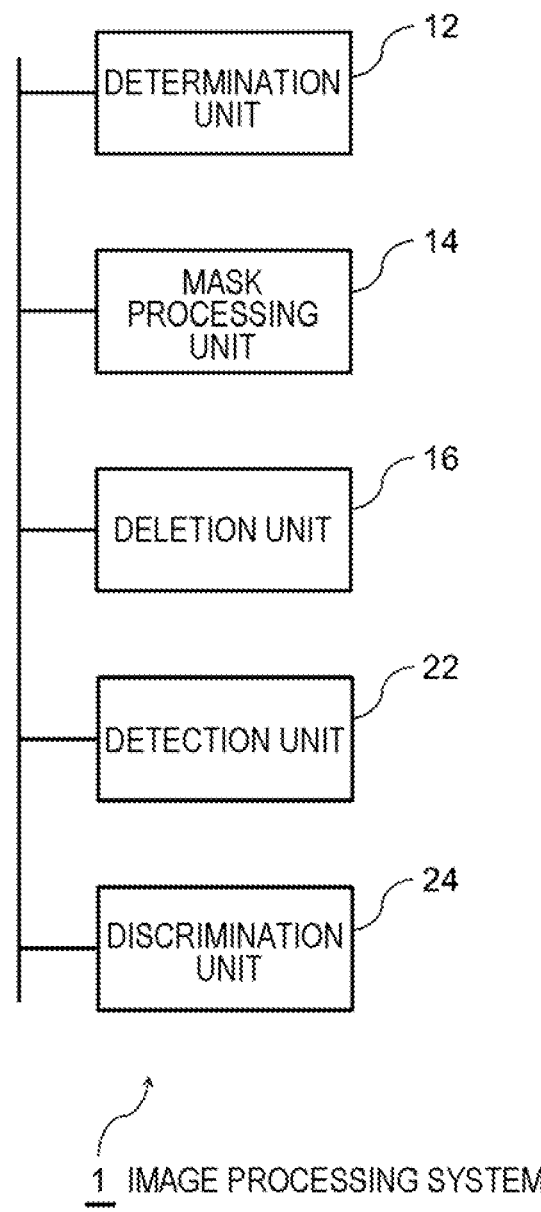
FIG. 22 is a diagram illustrating an overview of an image processing system according to an example embodiment.

FIG. 22 is a diagram illustrating an overview of an image processing system 1 according to an example embodiment.

The image processing system 1 according to the present example embodiment is the same as that in the sixth example embodiment except for a point that an underage included in an image is discriminated, and mask processing is performed on an entire person of the underage.

The image processing system 1 according to the present example embodiment further includes a discrimination unit 24 in addition to the configuration in FIG. 20. Note that, the configuration of the present example embodiment may be combined as long as the present example embodiment is not inconsistent with at least any one of configurations of the other example embodiments other than the sixth example embodiment.

<Functional Configuration Example>

Identification information about a person is associated with information indicating an age of the person, and face information about the person.

The discrimination unit 24 performs, by using face information about a person, face authentication processing on a person determined by a determination unit 12, and discriminates whether the person is an underage by using information indicating an age of the person.

A mask processing unit 14 performs mask processing on an entire region of a person discriminated as an underage by the discrimination unit 24, and performs the mask processing on a face region including at least a part of a face of a person discriminated not to be the underage by the discrimination unit 24.

Identification information about a person is, for example, an individual number (so-called national identification number) for identifying a citizen. As another example, the identification information about a person may be an identification number of an identification card, such as a driver's license, a health insurance card, a passport, and a student's identification card, being associated with a face picture.

As described above, according to the present example embodiment, the discrimination unit 24 of the image processing system 1 performs, by using face information about a person, face authentication processing on a person determined by the determination unit 12, and discriminates whether the person is an underage by using information indicating an age of the person. The mask processing unit 14 performs mask processing on an entire region of a person discriminated as an underage by the discrimination unit 24, and performs the mask processing on a face region including at least a part of a face of a person discriminated not to be the underage by the discrimination unit 24.

With this configuration, an effect similar to that in the example embodiment described above can be achieved. Furthermore, an underage can be discriminated, and mask processing can be performed on not only a region of a face but also on a region of an entire person, and thus privacy of the underage can be more reliably protected.

Eighth Example Embodiment

FIG. 23 is a functional block diagram illustrating a functional configuration example of each apparatus of an image processing system 1 according to an example embodiment.

Similarly to the first example embodiment, the image processing system 1 according to the present example embodiment includes at least one of edges 100 and a processing apparatus 200. In other words, the present example embodiment is the same as the seventh example embodiment except for a point that a function is performed and shared by the edge 100 and the processing apparatus 200, and an image processed by the edge 100 is displayed by the processing apparatus 200.

The edge 100 includes an image generation unit 102, and a determination unit 12, a mask processing unit 14, a detection unit 22, and a discrimination unit 24 that are the same as those in FIG. 22, and also further includes a transmission unit 104. The processing apparatus 200 includes an image processing unit 202, and a deletion unit 16 that is the same as that in FIG. 22, and also further includes a display processing unit 204.

The transmission unit 104 of the edge 100 transmits an image after mask processing is performed to the processing apparatus 200.

The display processing unit 204 of the processing apparatus 200 displays the image received from the edge 100 on a display of the processing apparatus 200.

In the edge 100, the discrimination unit 24 may provide a label to an image including an underage distinguishably from another image.

Then, the transmission unit 104 transmits the image provided with the label to the processing apparatus 200.

In the processing apparatus 200, an image provided with a label is preferably displayed by the display processing unit 204 distinguishably from an image provided with no label. For example, a message indicating that an underage is included may be displayed on an image. An image different from another region subjected to mask processing may be superimposed and displayed on a region of an underage being subjected to masking. For example, a degree of concealment in a region of an underage may be greater than a degree of concealment in a region other than the underage.

Furthermore, the mask processing unit 14 may recognize, by object recognition processing, an object worn by a determined person, and perform mask processing on a region of the recognized object.

The object includes, for example, a hat, a mask, glasses, hair, and the like on a head of a determined person. Assuming that only a face region of a determined person is a masking target region, for example, when the person is wearing a large hat, the hat may protrude from the masking target region, and a portion not subjected to mask processing may be left. Thus, in this example, the mask processing can be performed in consideration of the object.

As described above, according to the present example embodiment, the image processing system 1 includes the edge 100 and the processing apparatus 200. In the edge 100, the discrimination unit 24 provides a label to an image including an underage distinguishably from another image, and the transmission unit 104 transmits the image provided with the label to the processing apparatus 200.

With this configuration, an effect similar to that in the example embodiment described above can be achieved. Furthermore, in the processing apparatus 200, the display processing unit 204 can display an image provided with a label and an image provided with no label distinguishably from each other. Thus, an image in which an underage is present can be distinguished, and a degree of concealment is also increased, and thus privacy of the underage can be more greatly protected.

OTHER EXAMPLE EMBODIMENT

While the example embodiments of the present invention have been described with reference to the drawings, the example embodiments are only exemplification of the present invention, and various configurations other than the above-described example embodiments can also be employed.

For example, the configuration for providing a label to the image for an underage is described in the example embodiment described above, but another example embodiment may further have a configuration for also providing a different label to a person other than an underage for each piece of processing.

Specifically, first, for a person determined by a determination unit 12, an image 32 of a face region 34 after mask processing by a mask processing unit 14 may be stored as a virtual face image in a storage apparatus 120 in association with the image (frame) in an edge 100. At this time, the face image is further associated with a label "A". Further, an image in which a person is not determined may be associated with a label "B". Note that, processing of determining a person can be performed for a plurality of times with recognition accuracy increased, and similar mask processing may also be performed on an additionally determined person, and the label may be changed from "B" to "A".

For example, a deletion unit 16 may preferentially delete an image associated with the label "B". In other words, a high degree of priority of deletion may be set to an image provided with the label "B".

When the underage described above is discriminated by a discrimination unit 24, an image in a region of an entire person after mask processing on the underage may be stored as a person image of the image in association with a label "C" in the storage apparatus 120.

For a person detected to be performing abnormal behavior by a behavior analysis by an image processing unit 202, the image 32 of the face region 34 after the mask processing by the mask processing unit 14 may be stored as a virtual face image in association with the image (frame) in the storage apparatus 120. At this time, the face image is associated with a label "D".

When the abnormal behavior is classified into a category having high illegality by a classification unit 208, the face image is associated with a label "E".

The image processing unit 202 performs comparison processing with an image during a fixed time (for example, before and after a few seconds) in a series of images (frames), and an image having a change may be associated with a label "F", and an image having no change may be associated with a label "G". A high degree of priority of deletion may be set to an image of the label "G" having no change.

Figure 24:
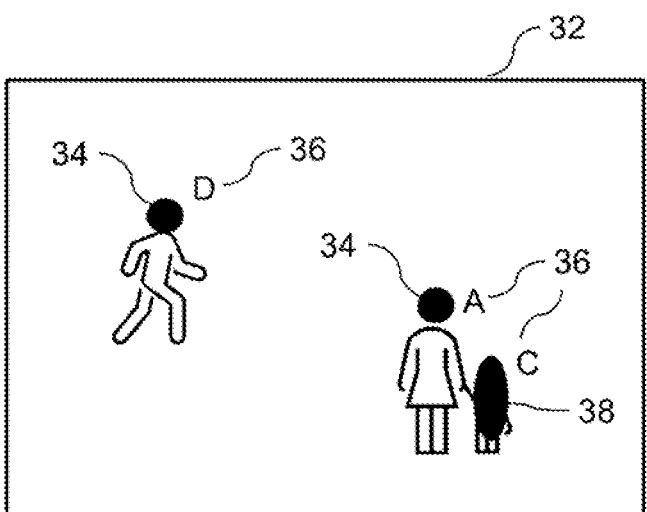
FIG. 24 is a diagram illustrating an example of an image displayed on an image display portion of the screen in FIG. 10.

FIG. 24 is a diagram illustrating an example of the image 32 displayed on the image display portion 410 of the screen 400 in FIG. 10. A display processing unit 204 provides a label display portion 36 near each face region 34 in an image provided with a label as described above, and displays each label provided to the face region 34.

For example, for a person just determined by the determination unit 12, the mask processing is performed on the face region 34, and "A" is displayed on the label display portion 36 located near the face region 34. Further, for a person discriminated as an underage, the mask processing is performed on a body region 38 of an entire body, and "C" is displayed on the label display portion 36 located near the body region 38.

Furthermore, for a person in which abnormal behavior is detected as a result of a behavior analysis by the image processing unit 202, the mask processing is performed on the face region 34, and "D" is displayed on the label display portion 36 located near the face region 34.

According to this configuration, a label is provided to an image and a region for each piece of processing, and thus each piece of the processing can be performed based on the label as described above. Thus, an enormous amount of image data can be easily identified, and each piece of the processing can also be simplified.

In still another example embodiment, a processing apparatus 200 may further include a notification unit (not illustrated) that notifies a predetermined destination when an image is classified into a category having high illegality in a classification unit 208. The predetermined destination is preferably preregistered. The predetermined destination is, for example, a destination that can notify a terminal of a police station and a security company, and a terminal of a police officer, a security guard, a manager, and the like, and is not particularly limited. The destination is an e-mail address, a cellular phone number for short message service (SMS), a destination of another communication application, and the like, and is not particularly limited. Further, the notification unit may display a notification screen on a display of the processing apparatus 200.

Furthermore, in another example embodiment, a display processing unit 204 may display information about abnormal behavior detected by an image processing unit 202 on a display of a processing apparatus 200, and the like. The information about abnormal behavior is, for example, statistical information such as the number of cases of detection of abnormal behavior detected by a camera 50 at a certain place within a fixed period (for example, one hour, one day, one week, one month, a half year, and the like). Further, statistical information such as the number of cases of detection of abnormal behavior by region at an installation place of a plurality of the cameras 50 may be able to be displayed.

This example may be combined with a display of a summary image by category described in the modification aspect of the fourth example embodiment described above.

Although the invention of the present application has been described with reference to the example embodiments, it should be understood that the invention of the present application is not limited to the above-described example embodiments. Various modifications that can be understood by those skilled in the art can be made to the configuration and the details of the invention of the present application within the scope of the invention of the present application.

Note that, when information about a person is acquired and used in the present invention, this is lawfully performed.

Further, the plurality of steps (pieces of processing) are described in order in the plurality of flowcharts used in the above-described description, but an execution order of steps performed in each of the example embodiments is not limited to the described order. In each of the example embodiments, an order of illustrated steps may be changed within an extent that there is no harm in context. Further, each of the example embodiments described above can be combined within an extent that a content is not inconsistent.

A part or the whole of the above-described example embodiment may also be described in supplementary notes below, which is not limited thereto.

1. An image processing system including:
   a determination unit that determines a person included in an image;
   a mask processing unit that performs mask processing on a face region including at least a part of a face of the determined person; and
   a deletion unit that deletes an unnecessary portion from the image.

2. The image processing system according to supplementary note 1, further including:
   an edge including an image generation unit that generates the image, the determination unit, and the mask processing unit; and
   a processing apparatus including an image processing unit that performs image processing, and the deletion unit, wherein
   the edge further includes a transmission unit that transmits, to the processing apparatus, an image after the mask processing is performed by the mask processing unit on the image generated by the image generation unit, and, in the processing apparatus, the image processing unit receives the image transmitted from the edge, and performs the image processing of the image, and the deletion unit performs deletion of the unnecessary portion from the image, based on a result of the image processing.

3. The image processing system according to supplementary note 2, wherein, in the processing apparatus, the image processing unit performs a behavior analysis of the person in the image by the image processing by using the image received from the edge.

4. The image processing system according to supplementary note 3, wherein the processing apparatus further includes a display processing unit that displays, in a case where abnormal behavior of the person is detected by the behavior analysis, the image for a predetermined time before and after and including abnormal behavior on a display unit.

5. The image processing system according to supplementary note 4, wherein the mask processing unit of the edge performs the mask processing in such a way that the mask processing can be canceled, and the processing apparatus further includes a decision unit that decides whether a portion subjected to masking in the face region included in the image of for the predetermined time can be canceled.

6. The image processing system according to supplementary note 5, wherein the display processing unit of the processing apparatus displays, on the display unit, the image in which the masking in the face region included in the image of for the predetermined time is canceled when the decision unit decides that the masking can be canceled.

7. The image processing system according to any one of supplementary notes 2 to 6, wherein, in the edge, the image generation unit separates the image into an image of a background and an image of a person, and the transmission unit transmits the image of the person to the processing apparatus.

8. The image processing system according to supplementary note 3 and any one of supplementary notes 4 to 7 citing supplementary note 3, wherein the processing apparatus further includes a classification unit that classifies the image into a plurality of categories by using a result of the behavior analysis.

9. The image processing system according to supplementary note 8, wherein, in the processing apparatus, the deletion unit performs deletion of the unnecessary portion from the image according to a degree of priority of deletion determined according to the category.

10. The image processing system according to supplementary note 8 or 9, wherein, in the processing apparatus, the classification unit stores, by the category, the image classified into the plurality of categories in a storage unit.

11. The image processing system according to any one of supplementary notes 2 to 10, wherein, in the edge, the mask processing unit performs mask processing that can be canceled by key information, and the transmission unit transmits the key information to a management apparatus.

12. The image processing system according to supplementary note 11, further including the management apparatus, wherein the transmission unit of the edge transmits the key information together with a capturing place and a capturing time of the image to the management apparatus, the management apparatus includes a storage processing unit that encrypts, with a capturing place and a capturing time of the image as a decryption key, the key information received from the edge, and then stores the encrypted key information in association with the decryption key in a storage unit, and a transmission unit that, when the capturing place and the capturing time are received from the processing apparatus, decrypting the key information by using the associated decryption key, and transmitting the key information to the processing apparatus.

13. The image processing system according to supplementary note 12, wherein, in the edge, the image generation unit separates the image into an image of a background and an image of a person, and the transmission unit further transmits the image of the background together with the key information to the management apparatus, and, in the management apparatus, the storage processing unit further stores the image of the background in association with the key information, and, when the image of the background is received together with the capturing place and the capturing time from the processing apparatus, and an image of a background associated with a decryption key associated with the capturing place and the capturing time and the received image of the background coincide with each other, the transmission unit decrypts the key information by using the decryption key, and transmits the key information to the processing apparatus.

14. The image processing system according to supplementary note 12, wherein, in the edge, the image generation unit separates the image into an image of a background and an image of a person, and the transmission unit further transmits the image of the background together with the key information to the management apparatus, and, in the management apparatus, the storage processing unit further encrypts the key information with the image of the background as the decryption key, and stores the key information in association with the decryption key, and, when the image of the background is received together with the capturing place and the capturing time from the processing apparatus, the transmission unit decrypts the key information by using the associated decryption key, and transmits the key information to the processing apparatus.

15. The image processing system according to supplementary note 1, further including a detection unit that detects, by face authentication processing, a target person from the person determined from the image, wherein the mask processing unit performs the mask processing on a person other than the target person when the target person is detected, and the deletion unit deletes an image in which the target person is not detected.

16. The image processing system according to supplementary note 15, wherein identification information about a person is associated with information indicating an age of the person, and face information about the person, the image processing system further including a discrimination unit that performs, by using the face information about the person, face authentication processing on a person determined by the determination means, and discriminates whether the person is an underage by using information indicating an age of the person, wherein the mask processing unit performs mask processing on an entire region of the person discriminated as the underage by the discrimination unit, and performs mask processing on a face region including at least a part of a face of a person discriminated not to be the underage by the discrimination unit.

17. The image processing system according to supplementary note 16, further including:

an edge including an image generation unit that generates the image, the determination unit, the mask processing unit, the detection unit, and the discrimination unit; and a processing apparatus including an image processing unit that performs image processing, and the deletion unit, wherein the edge further includes a transmission unit that transmits, to the processing apparatus, the image after the mask processing is performed, and the processing apparatus further includes a display processing unit that displays the image on a display unit.

18. The image processing system according to supplementary note 17, wherein the discrimination unit of the edge provides a label to an image including the underage distinguishably from another image, and the transmission unit of the edge transmits the image provided with the label to the processing apparatus.

19. The image processing system according to any one of supplementary notes 15 to 18, wherein the mask processing unit recognizes, by object recognition processing, an object worn by the determined person, and performs the mask processing on a region of the recognized object.

20. An image processing method including, by one or more computers:

determining a person included in an image;

performing mask processing on a face region including at least a part of a face of the determined person; and deleting an unnecessary portion from the image.

21. The image processing method according to supplementary note 20, wherein the one or more computers include a first computer and a second computer, the image processing method further including, by the first computer:

generating an image;

determining a person included in the image;

performing mask processing on a face region including at least a part of a face of the determined person; and transmitting an image after the mask processing is performed to the second computer, by the second computer:

receiving the image transmitted from the first computer, and performing image processing of the image; and performing deletion of the unnecessary portion from the image, based on a result of the image processing.

22. The image processing method according to supplementary note 21, further including, by the second computer, performing a behavior analysis of the person in the image by the image processing by using the image received from the first computer.

23. The image processing method according to supplementary note 22, further including, by the second computer, further displaying, in a case where abnormal behavior of the person is detected by the behavior analysis, the image for a predetermined time before and after and including abnormal behavior on a display unit.

24. The image processing method according to supplementary note 23, further including, by the first computer, performing the mask processing in such a way that the mask processing can be canceled, by the second computer, further deciding whether a portion subjected to masking in the face region included in the image of for the predetermined time can be canceled.

25. The image processing method according to supplementary note 24, further including, by the second computer, displaying, on the display unit, the image in which the masking in the face region included in the image of for the predetermined time is canceled when it is decided that the masking can be canceled.

26. The image processing method according to any one of supplementary notes 21 to 25, further including, by the first computer:

separating the image into an image of a background and an image of a person; and transmitting the image of the person to the second computer.

27. The image processing method according to supplementary note 22 and any one of supplementary notes 23 to 26 citing supplementary note 22, further including, by the second computer, further classifying the image into a plurality of categories by using a result of the behavior analysis.

28. The image processing method according to supplementary note 27, further including, by the second computer, performing deletion of the unnecessary portion from the image according to a degree of priority of deletion determined according to the category.

29. The image processing method according to supplementary note 27 or 28, further including, by the second computer, storing, by the category, the image classified into the plurality of categories in a storage unit.

30. The image processing method according to any one of supplementary notes 21 to 29, further including, by the first computer:

performing mask processing that can be canceled by key information; and transmitting the key information to a third computer.

31. The image processing method according to supplementary note 30, wherein the one or more computers further include the third computer, the image processing method further including, by the first computer, transmitting the key information together with a capturing place and a capturing time of the image to the third computer, by the third computer:

encrypting, with a capturing place and a capturing time of the image as a decryption key, the key information received from the first computer, and then storing the encrypted key information in association with the decryption key in a storage unit; and, when the capturing place and the capturing time are received from the second computer, decrypting the key information by using the associated decryption key, and transmitting the key information to the second computer.

32. The image processing system according to supplementary note 31, further including, by the first computer:

separating the image into an image of a background and an image of a person; and further transmitting the image of the background together with the key information to the third computer, by the third computer:

further storing the image of the background in association with the key information; and, when the image of the background is received together with the capturing place and the capturing time from the second computer, and an image of a background associated with a decryption key associated with the capturing place and the capturing time and the received image of the background coincide with each other, decrypting the key information by using the decryption key, and transmitting the key information to the second computer.

33. The image processing method according to supplementary note 31, further including, by the first computer:

separating the image into an image of a background and an image of a person; and further transmitting the image of the background together with the key information to the third computer, by the third computer:

further encrypting the key information with the image of the background as the decryption key, and storing the key information in association with the decryption key; and when the image of the background is received together with the capturing place and the capturing time from the second computer, decrypting the key information by using the associated decryption key, and transmitting the key information to the second computer.

34. The image processing method according to supplementary note 20, further including, by the one or more computers:

detecting, by face authentication processing, a target person from the person determined from the image;

performing the mask processing on a person other than the target person when the target person is detected; and deleting an image in which the target person is not detected.

35. The image processing method according to supplementary note 34, wherein identification information about a person is associated with information indicating an age of the person, and face information about the person, the image processing method further including, by the one or more computers:

performing, by using the face information about the person, face authentication processing on a person determined by the determination unit, and discriminating whether the person is an underage by using information indicating an age of the person;

performing mask processing on an entire region of the person discriminated as the underage; and performing mask processing on a face region including at least a part of a face of a person discriminated not to be the underage.

36. The image processing method according to supplementary note 35, wherein the one or more computers include a first computer and a second computer, the image processing method further including, by the first computer:

generating an image;

determining a person included in the image;

detecting, by face authentication processing, a target person from the person determined from the image;

performing mask processing on a face region including at least a part of a face of the person other than the target person when the target person is detected;

performing, by using the face information about the person, face authentication processing on the determined person, and discriminating whether the person is an underage by using information indicating an age of the person;

performing mask processing on an entire region of the person discriminated as the underage;

performing mask processing on a face region including at least a part of a face of a person discriminated not to be the underage; and transmitting the image after the mask processing is performed to the second computer, by the second computer:

receiving the image transmitted from the first computer, and performing image processing of the image;

deleting an unnecessary portion from the image; and displaying the image on a display unit.

37. The image processing method according to supplementary note 36, further including, by the first computer:

providing a label to an image including the underage distinguishably from another image; and transmitting the image provided with the label to the second computer.

38. The image processing method according to any one of supplementary notes 34 to 37, further including,
by the one or more computers,
recognizing, by object recognition processing, an object worn by the determined person, and performing the mask processing on a region of the recognized object.

39. A program for causing a computer to execute:
determination processing of determining a person included in an image;
mask processing of performing mask processing on a face region including at least a part of a face of the determined person; and
transmission processing of transmitting, to a processing apparatus, an image after the mask processing is performed by the mask processing.

40. The program according to supplementary note 39, further executing,
in the mask processing, performing the mask processing in such a way that the mask processing can be canceled.

41. The program according to supplementary note 39 or 40, further causing the computer to execute:
image generation processing of generating an image;
in the image generation processing, separating the image into an image of a background and an image of a person; and,
in the transmission processing, transmitting the image of the person to the processing apparatus.

42. The program according to any one of supplementary notes 39 to 41, further causing the computer to execute:
in the mask processing, performing the mask processing that can be canceled by key information; and,
in the transmission processing, transmitting the key information to a management apparatus different from the processing apparatus.

43. The program according to supplementary note 42, further executing,
in the transmission processing, transmitting the key information together with a capturing place and a capturing time of the image to the management apparatus.

44. The program according to supplementary note 43, further causing the computer to execute:
image generation processing of generating an image;
in the image generation processing, separating the image into an image of a background and an image of a person; and,
in the transmission processing, transmitting the image of the background together with the key information to the management apparatus.

45. The program according to supplementary note 39, further causing the computer to execute:
detection processing of detecting, by face authentication processing, a target person from the person determined from the image; and,
in the mask processing, performing the mask processing on a person other than the target person when the target person is detected.

46. The program according to supplementary note 45, wherein
identification information about a person is associated with information indicating an age of the person, and face information about the person,
the program further causing the computer to execute:
discrimination processing of performing, by using the face information about the person, face authentication processing on a person determined by the determination processing, and discriminating whether the person is an underage by using information indicating an age of the person,
in the mask processing;
performing mask processing on an entire region of the person discriminated as the underage by the discrimination processing; and
performing mask processing on a face region including at least a part of a face of a person discriminated not to be the underage by the discrimination processing.

47. The program according to supplementary note 46, further executing:
in the discrimination processing, providing a label to an image including the underage distinguishably from another image; and,
in the transmission processing, transmitting the image provided with the label to the processing apparatus.

48. The program according to any one of supplementary notes 45 to 47, further executing,
in the mask processing, recognizing, by object recognition processing, an object worn by the determined person, and performing the mask processing on a region of the recognized object.

49. A program for causing a computer to execute:
image processing of receiving an image transmitted from an edge, and performing image processing of the image; and
deletion processing of performing deletion of an unnecessary portion from the image, based on a result of the image processing.

50. The program according to supplementary note 49, further executing,
in the image processing, performing a behavior analysis of the person in the image by the image processing by using the image received from the edge.

51. The program according to supplementary note 50, further causing the computer to execute
display processing of displaying, in a case where abnormal behavior of the person is detected by the behavior analysis, the image for a predetermined time before and after and including abnormal behavior on a display unit.

52. The program according to supplementary note 51, further causing the computer to execute
decision processing of deciding whether a portion subjected to masking in a face region of a person included in the image of for the predetermined time can be canceled.

53. The program according to supplementary note 52, further executing,
in the display processing, displaying, on the display unit, the image in which the masking in the face region of the person included in the image of for the predetermined time is canceled when the decision processing decides that the masking can be canceled.

54. The program according to supplementary note 50 and any one of supplementary notes 51 to 53 citing supplementary note 50, further causing the computer to execute
classification processing of classifying the image into a plurality of categories by using a result of the behavior analysis.

55. The program according to supplementary note 54, further executing,
in the deletion processing, performing deletion of the unnecessary portion from the image according to a degree of priority of deletion determined according to the category.
56. The program according to supplementary note 54 or 55, further executing,
in the classification processing, storing, by the category, the image classified into the plurality of categories in a storage unit.
57. The program according to supplementary note 49, further executing,
in the deletion processing, deleting an image in which a target person is not detected by face authentication processing from a person in the image.
58. A program for causing a computer to execute:
storage processing of encrypting, with a capturing place and a capturing time of an image as a decryption key, key information received from an edge, and then storing the key information in association with the decryption key in a storage unit; and
transmission processing of, when the capturing place and the capturing time are received from a processing apparatus, decrypting the key information by using the associated decryption key, and transmitting the key information to the processing apparatus.
59. The program according to supplementary note 58, further executing,
in the storage processing, receiving, from the edge, the key information together with an image of a background acquired by separating the image into the background and a person, and further storing the image of the background in association with the key information, and,
in the transmission processing, when the image of the background is received together with the capturing place and the capturing time from the processing apparatus, and an image of a background associated with a decryption key associated with the capturing place and the capturing time and the received image of the background coincide with each other, decrypting the key information by using the decryption key, and transmitting the key information to the processing apparatus.
60. The program according to supplementary note 58, further executing,
in the storage processing, receiving, from the edge, an image of a background acquired by separating the image into the background and a person, and the key information, further encrypting the key information with the image of the background as the decryption key, and storing the key information in association with the decryption key, and,
in the transmission processing, when the image of the background is received together with the capturing place and the capturing time from the processing apparatus, decrypting the key information by using the associated decryption key, and transmitting the key information to the processing apparatus.
61. A computer-readable storage medium storing a program for causing a computer to execute:
determination processing of determining a person included in an image;
mask processing of performing mask processing on a face region including at least a part of a face of the determined person; and

transmission processing of transmitting, to a processing apparatus, an image after the mask processing is performed by the mask processing.
62. The computer-readable storage medium storing a program according to supplementary note 61, further executing,
in the mask processing, performing the mask processing in such a way that the mask processing can be canceled.
63. The computer-readable storage medium storing a program according to supplementary note 61 or 62, the program further causing the computer to execute:
image generation processing of generating an image;
in the image generation processing, separating the image into an image of a background and an image of a person; and,
in the transmission processing, transmitting the image of the person to the processing apparatus.
64. The computer-readable storage medium storing a program according to any one of supplementary notes 61 to 63, the program further causing the computer to execute:
in the mask processing, performing the mask processing that can be canceled by key information; and,
in the transmission processing, transmitting the key information to a management apparatus different from the processing apparatus.
65. The computer-readable storage medium storing a program according to supplementary note 64, further executing,
in the transmission processing, transmitting the key information together with a capturing place and a capturing time of the image to the management apparatus.
66. The computer-readable storage medium storing a program according to supplementary note 65, the program further causing the computer to execute:
image generation processing of generating an image;
in the image generation processing, separating the image into an image of a background and an image of a person; and,
in the transmission processing, transmitting the image of the background together with the key information to the management apparatus.
67. The computer-readable storage medium storing a program according to supplementary note 61, the program further causing the computer to execute:
detection processing of detecting, by face authentication processing, a target person from the person determined from the image; and,
in the mask processing, performing the mask processing on a person other than the target person when the target person is detected.
68. The computer-readable storage medium storing a program according to supplementary note 67, wherein
identification information about a person is associated with information indicating an age of the person, and face information about the person,
the program further causing the computer to execute:
discrimination processing of performing, by using the face information about the person, face authentication processing on a person determined by the determination processing, and discriminating whether the person is an underage by using information indicating an age of the person, in the mask processing;

performing mask processing on an entire region of the person discriminated as the underage by the discrimination processing; and performing mask processing on a face region including at least a part of a face of a person discriminated not to be the underage by the discrimination processing.

69. The computer-readable storage medium storing a program according to supplementary note 68, further executing:

in the discrimination processing, providing a label to an image including the underage distinguishably from another image; and, in the transmission processing, transmitting the image provided with the label to the processing apparatus.

70. The computer-readable storage medium storing a program according to any one of supplementary notes 67 to 69, further executing, in the mask processing, recognizing, by object recognition processing, an object worn by the determined person, and performing the mask processing on a region of the recognized object.

71. A computer-readable storage medium storing a program for causing a computer to execute:

image processing of receiving an image transmitted from an edge, and performing image processing of the image; and deletion processing of performing deletion of an unnecessary portion from the image, based on a result of the image processing.

72. The computer-readable storage medium storing a program according to supplementary note 71, further executing, in the image processing, performing a behavior analysis of the person in the image by the image processing by using the image received from the edge.

73. The computer-readable storage medium storing a program according to supplementary note 72, the program further causing the computer to execute display processing of displaying, in a case where abnormal behavior of the person is detected by the behavior analysis, the image for a predetermined time before and after and including abnormal behavior on a display unit.

74. The computer-readable storage medium storing a program according to supplementary note 73, the program further causing the computer to execute decision processing of deciding whether a portion subjected to masking in a face region of a person included in the image of for the predetermined time can be canceled.

75. The computer-readable storage medium storing a program according to supplementary note 74, further executing, in the display processing, displaying, on the display unit, the image in which the masking in the face region of the person included in the image of for the predetermined time is canceled when the decision processing decides that the masking can be canceled.

76. The computer-readable storage medium storing a program according to supplementary note 72 and any one of supplementary notes 73 to 75 citing supplementary note 72, the program further causing the computer to execute classification processing of classifying the image into a plurality of categories by using a result of the behavior analysis.

77. The computer-readable storage medium storing a program according to supplementary note 76, further executing, in the deletion processing, performing deletion of the unnecessary portion from the image according to a degree of priority of deletion determined according to the category.

78. The computer-readable storage medium storing a program according to supplementary note 76 or 77, further executing, in the classification processing, storing, by the category, the image classified into the plurality of categories in a storage unit.

79. The computer-readable storage medium storing a program according to supplementary note 71, further executing, in the deletion processing, deleting an image in which a target person is not detected by face authentication processing from a person in the image.

80. A computer-readable storage medium storing a program for causing a computer to execute:

storage processing of encrypting, with a capturing place and a capturing time of an image as a decryption key, key information received from an edge, and then storing the key information in association with the decryption key in a storage unit; and transmission processing of, when the capturing place and the capturing time are received from a processing apparatus, decrypting the key information by using the associated decryption key, and transmitting the key information to the processing apparatus.

81. The computer-readable storage medium storing a program according to supplementary note 80, further executing, in the storage processing, receiving, from the edge, the key information together with an image of a background acquired by separating the image into the background and a person, and further storing the image of the background in association with the key information, and, in the transmission processing, when the image of the background is received together with the capturing place and the capturing time from the processing apparatus, and an image of a background associated with a decryption key associated with the capturing place and the capturing time and the received image of the background coincide with each other, decrypting the key information by using the decryption key, and transmitting the key information to the processing apparatus.

82. The computer-readable storage medium storing a program according to supplementary note 80, further executing, in the storage processing, receiving, from the edge, an image of a background acquired by separating the image into the background and a person, and the key information, further encrypting the key information with the image of the background as the decryption key, and storing the key information in association with the decryption key, and, in the transmission processing, when the image of the background is received together with the capturing place and the capturing time from the processing apparatus, decrypting the key information by using the associated decryption key, and transmitting the key information to the processing apparatus.

What is claimed is:

1. An image processing system comprising:

at least one memory configured to store instructions;

at least one processor configured to execute the instructions to:

determine a person included in an image;

perform mask processing on a face region including at least a part of a face of the determined person; and delete an unnecessary portion from the image, an edge; and a processing apparatus, wherein the edge includes:

at least one memory configured to store instructions; and at least one processor configured to execute the instructions to:

generate an image;

determine a person included in the image;

perform mask processing on a face region including at least a part of a face of the determined person; and transmit, to the processing apparatus, an image after the mask processing is performed on the generated image, wherein the processing apparatus comprises:

at least one memory configured to store instructions; and at least one processor configured to execute the instructions to:

receive the image transmitted from the edge;

perform image processing on the received image; and perform deletion of the unnecessary portion from the image, based on a result of the image processing.

2. The image processing system according to claim 1, wherein, in the processing apparatus, the at least one processor is further configured to execute the instructions to:

perform a behavior analysis of the person in the image by the image processing by using the image received from the edge.

3. The image processing system according to claim 2, wherein in the processing apparatus, the at least one processor is further configured to execute the instructions to:

display, in a case where abnormal behavior of the person is detected by the behavior analysis, the image for a predetermined time before and after and including the abnormal behavior on a display unit.

4. The image processing system according to claim 3, wherein in the edge, the at least one processor is further configured to execute the instructions to:

perform the mask processing in such a way that the mask processing can be canceled, and wherein in the processing apparatus, the at least one processor is further configured to execute the instructions to:

decide whether a portion subjected to masking in the face region included in the image of for the predetermined time can be canceled.

5. The image processing system according to claim 1, wherein the at least one processor is further configured to execute the instructions to:

detect, by face authentication processing, a target person from the person determined from the image;

perform the mask processing on a person other than the target person when the target person is detected; and delete an image in which the target person is not detected.

6. The image processing system according to claim 5, wherein identification information about a person is associated with information indicating an age of the person, and face information about the person, and wherein the at least one processor is further configured to execute the instructions to:

perform, by using the face information about the person, face authentication processing on the determined person, and discriminate whether the person is an underage by using information indicating an age of the person;

perform mask processing on an entire region of the person discriminated as the underage; and perform mask processing on a face region including at least a part of a face of the person discriminated not to be the underage.

7. The image processing system according to claim 6, wherein in the edge the at least one processor is further configured to execute the instructions to:

perform, by using the face information about the person, face authentication processing on the determined person, and discriminate whether the person is an underage by using information indicating an age of the person; and transmit, to the processing apparatus, an image after the mask processing is performed on the generated image, wherein in the processing apparatus the at least one processor is further configured to execute the instructions to:

display the received image on a display unit.

8. An image processing method comprising:

by one or more computers:

determining a person included in an image;

performing mask processing on a face region including at least a part of a face of the determined person; and deleting an unnecessary portion from the image, wherein the one or more computers comprise:

an edge; and a processing apparatus, wherein the image processing method further comprises:

by the edge:

generating an image;

determining a person included in the image;

performing mask processing on a face region including at least a part of a face of the determined person;

transmitting, to the processing apparatus, an image after the mask processing is performed on the generated image; and by the processing apparatus:

receiving the image transmitted from the edge;

performing image processing on the received image; and performing deletion of the unnecessary portion from the image, based on a result of the image processing.

9. The image processing method according to claim 8, wherein the image processing method further comprises:

in the processing apparatus executing the instructions to:

perform a behavior analysis of the person in the image by the image processing by using the image received from the edge.

10. The image processing method according to claim 9, further comprising:

by the processing apparatus:

displaying, in a case where abnormal behavior of the person is detected by the behavior analysis, the image for a predetermined time before and after and including the abnormal behavior on a display unit.

11. The image processing method according to claim 10, further comprising:

by the edge:

performing the mask processing in such a way that the mask processing can be canceled; and by the processing apparatus:

deciding whether a portion subjected to masking in the face region included in the image of for the predetermined time can be canceled.

12. The image processing method according to claim 8, further comprising:

detecting, by face authentication processing, a target person from the person determined from the image;

performing the mask processing on a person other than the target person when the target person is detected; and deleting an image in which the target person is not detected.

13. The image processing method according to claim 12, wherein identification information about a person is associated with information indicating an age of the person, and face information about the person, and wherein the image processing method comprises:

performing, by using the face information about the person, face authentication processing on the determined person, and discriminate whether the person is an underage by using information indicating an age of the person;

performing mask processing on an entire region of the person discriminated as the underage; and performing mask processing on a face region including at least a part of a face of the person discriminated not to be the underage.

14. A non-transitory computer-readable storage medium storing a program causing one or more computers to perform operations comprising:

determine a person included in an image;

perform mask processing on a face region including at least a part of a face of the determined person; and transmit, to a processing apparatus, an image after the mask processing is performed by the mask processing, wherein the one or more computers comprise:

an edge; and a processing apparatus, wherein the operations further comprise:

by the edge:

generating an image;

performing the determining the person included in the image;

performing the mask processing on the face region including the at least the part of the face of the determined person;

performing the transmitting, to the processing apparatus, the image after the mask processing is performed on the generated image; and by the processing apparatus:

receiving the image transmitted from the edge;

performing image processing on the received image; and performing deletion of the unnecessary portion from the image, based on a result of the image processing.

15. The non-transitory computer-readable storage medium according to claim 14, wherein the program causes the computer to:

delete an image in which the target person is not detected.

16. The non-transitory computer-readable storage medium according to claim 14, wherein the program causes the computer to:

perform the mask processing in such a way that the mask processing can be canceled.

17. The non-transitory computer-readable storage medium according to claim 14, wherein the program causes the computer to:

detect, by face authentication processing, a target person from the person determined from the image; and perform the mask processing on a person other than the target person when the target person is detected.

18. The non-transitory computer-readable storage medium according to claim 17, wherein identification information about a person is associated with information indicating an age of the person, and face information about the person, and wherein the program causes the computer to:

perform, by using the face information about the person, face authentication processing on the determined person, and discriminate whether the person is an underage by using information indicating an age of the person;

perform mask processing on an entire region of the person discriminated as the underage; and perform mask processing on a face region including at least a part of a face of the person discriminated not to be the underage.

* * * * *